(12) United States Patent
Khoo et al.

(10) Patent No.: US 10,880,159 B1
(45) Date of Patent: Dec. 29, 2020

(54) CENTRALIZED ACCESS OF CONFIGURATION DATA FOR COMPUTING RESOURCES

(71) Applicant: Amazon Technologies, Inc., Seattle, WA (US)

(72) Inventors: Boo Boon Khoo, Bellevue, WA (US); Siddharth Gupta, Bellevue, WA (US); Ravikanth Repaka, Bellevue, WA (US); Syed-Faraz-Ul Hassan Kazmi, Seattle, WA (US); Yao Li, Kirkland, WA (US); Mohammad Ali Shatnawi, Mill Creek, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/356,834

(22) Filed: Mar. 18, 2019

(51) Int. Cl.
*H04L 12/24* (2006.01)
*H04L 29/06* (2006.01)
(Continued)

(52) U.S. Cl.
CPC ...... *H04L 41/0803* (2013.01); *G06F 11/3006* (2013.01); *G06F 16/27* (2019.01);
(Continued)

(58) Field of Classification Search
CPC ........... G06F 11/00; G06F 11/30–3006; G06F 11/3051; G06F 11/3055; G06F 16/00; G06F 16/27; H04L 41/00; H04L 41/08; H04L 41/0803; H04L 41/0813; H04L 41/085–0859; H04L 41/22; H04L 63/00; H04L 63/10; H04L 67/00; H04L 67/10; H04L 67/107
See application file for complete search history.

(56) References Cited

U.S. PATENT DOCUMENTS

| 5,603,323 | A | * | 2/1997 | Pflugrath | ............ | G06F 19/3418 |
| | | | | | | 600/437 |
| 5,696,701 | A | * | 12/1997 | Burgess | ................ | G06F 11/348 |
| | | | | | | 702/186 |

(Continued)

*Primary Examiner* — Tauqir Hussain
*Assistant Examiner* — Boris D Grijalva Lobos
(74) *Attorney, Agent, or Firm* — Lee & Hayes, P.C.

(57) ABSTRACT

This disclosure describes techniques for a configuration-monitoring service of a service provider network to provide users with the ability to access to configuration data across multiple accounts using a single account or other centralized access point. The configuration-monitoring service may allow users with multiple accounts registered with the service provider network to designate a central account (or "aggregator account") through which the users can access and review configuration data across multiple accounts (or "source accounts") and/or multiple regions (or "source regions"). After determining an aggregator account, the configuration-monitoring service may begin collecting configuration data from the source accounts and/or source regions, and transporting the configuration data to the aggregator region to be accessed using the aggregator account. The user may use their aggregator account to view a dashboard that presents the configuration data from the source accounts and/or source regions along with configuration data for the aggregator account.

20 Claims, 14 Drawing Sheets

(51) Int. Cl.
 *G06F 11/30* (2006.01)
 *H04L 29/08* (2006.01)
 *G06F 16/27* (2019.01)
(52) U.S. Cl.
 CPC .............. *H04L 63/10* (2013.01); *H04L 41/22* (2013.01); *H04L 67/10* (2013.01)

(56) References Cited

U.S. PATENT DOCUMENTS

| | | | | |
|---|---|---|---|---|
| 6,173,311 B1* | 1/2001 | Hassett | ............... | H04L 67/2814 709/202 |
| 6,314,088 B1* | 11/2001 | Yamano | ............ | H04L 29/12009 370/254 |
| 6,704,737 B1* | 3/2004 | Nixon | ................. | G05B 19/4145 707/656 |
| 6,708,187 B1* | 3/2004 | Shanumgam | ....... | H04L 41/0233 |
| 6,785,726 B1* | 8/2004 | Freeman | ................. | G06F 9/542 709/227 |
| 6,973,491 B1* | 12/2005 | Staveley | ............. | H04L 41/0253 709/223 |
| 7,020,696 B1* | 3/2006 | Perry | ................... | H04L 41/0856 709/217 |
| 7,191,290 B1* | 3/2007 | Ackaouy | ............. | G06F 16/9574 711/119 |
| 7,519,694 B1* | 4/2009 | Arcot | ................. | G06F 16/9566 709/220 |
| 7,680,905 B1* | 3/2010 | Roberts | ................. | H04L 41/082 709/220 |
| 7,991,859 B1* | 8/2011 | Miller | .................. | H04L 41/0803 709/220 |
| 8,370,574 B2* | 2/2013 | Ballard | ................. | G06F 11/073 711/100 |
| 8,850,035 B1* | 9/2014 | Vemulapalli | ............. | H04L 67/10 455/404.2 |
| 9,998,499 B2* | 6/2018 | Mehta | ................... | G06F 21/604 |
| 2002/0057018 A1* | 5/2002 | Branscomb | ......... | H04L 41/0866 307/42 |
| 2009/0198796 A1* | 8/2009 | Wang | .................. | H04L 41/0803 709/220 |
| 2010/0241603 A1* | 9/2010 | Voskuil | ................. | G06N 5/022 706/47 |
| 2011/0313547 A1* | 12/2011 | Hernandez | ........... | G05B 19/042 700/23 |
| 2013/0073609 A1* | 3/2013 | Connolly | ............. | G06F 16/9574 709/203 |
| 2013/0103785 A1* | 4/2013 | Lyon | .................. | H04N 21/2385 709/217 |
| 2013/0125230 A1* | 5/2013 | Koponen | ................ | H04L 45/64 726/13 |
| 2015/0156619 A1* | 6/2015 | Fodor | ................... | H04W 8/005 455/434 |
| 2019/0065292 A1* | 2/2019 | Yu | ....................... | G06F 9/45558 |
| 2019/0116496 A1* | 4/2019 | Catovic | ............... | H04L 63/0428 |

* cited by examiner

900 ⟶

902 IDENTIFY A FIRST ACCOUNT AND A SECOND ACCOUNT REGISTERED WITH A SERVICE PROVIDER NETWORK ON BEHALF OF AN ENTITY, THE FIRST ACCOUNT BEING ASSOCIATED WITH FIRST COMPUTING RESOURCES IN A FIRST REGION OF THE SERVICE PROVIDER NETWORK AND THE SECOND ACCOUNT BEING ASSOCIATED WITH SECOND COMPUTING RESOURCES IN A SECOND REGION OF THE SERVICE PROVIDER NETWORK

904 STORE, IN A FIRST STORAGE LOCATION IN THE FIRST REGION, FIRST CONFIGURATION DATA ASSOCIATED WITH FIRST RESOURCE CONFIGURATIONS OF THE FIRST COMPUTING RESOURCES, THE FIRST ACCOUNT HAVING ACCESS TO THE FIRST CONFIGURATION DATA

906 STORE, IN A SECOND STORAGE LOCATION IN THE SECOND REGION, SECOND CONFIGURATION DATA ASSOCIATED WITH SECOND RESOURCE CONFIGURATIONS OF THE SECOND COMPUTING RESOURCES, THE SECOND ACCOUNT HAVING ACCESS TO THE SECOND CONFIGURATION DATA

908 SEND THE SECOND CONFIGURATION DATA FROM THE SECOND STORAGE LOCATION IN THE SECOND REGION TO AT LEAST ONE OF THE FIRST STORAGE LOCATION OR A THIRD STORAGE LOCATION IN THE FIRST REGION

910 PROVIDE THE FIRST ACCOUNT WITH ACCESS TO THE SECOND CONFIGURATION DATA

FIG. 9

CENTRALIZED ACCESS OF CONFIGURATION DATA FOR COMPUTING RESOURCES

BACKGROUND

Service providers offer cloud-based services to fulfill users' computing-service needs without the users having to invest in and maintain computing infrastructure required to implement the services. These service providers may maintain networks of managed computing resources and functionality to implement various types of on-demand services, such as storage services, compute-power services, database-management services, networking services, and so forth. In this way, service providers maintain service provider networks that provide users with on-demand delivery of compute power, database storage, applications, and other resources, rather than the users having to make upfront investments in hardware and spend time and resources managing the hardware.

The computing resources are often provisioned and managed on behalf of the users according to various configuration settings specified by the users and/or the service providers. For example, the computing resources may be configured according to configuration settings that define security policies, total number of computing resources permitted to be provisioned for a user account, permissible software versions, permitted types of computing resources for a user account, require data backups for storage, and/or other rules with which the computing resources are to comply.

Due to the large amounts of computing resources, the service provider network may provide a configuration-monitoring service that enables users to assess, audit, and evaluate the configurations of their computing resources. For example, the configuration-monitoring service may continuously monitor and record the computing resource configurations, and allow the users to automate the evaluation of recorded configurations against desired configurations to determine overall compliance. While the configuration-monitoring service may help users assess and evaluate the configurations of their resources, various difficulties may arise for users with multiple user accounts and/or large amounts of computing resources provisioned in the service provider network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 9 illustrates a flow diagram of an example method for a configuration-monitoring service to aggregate configuration data from a source region to an aggregator account in an aggregator region, and provide access to the source configuration data to a user of the aggregator account.

DETAILED DESCRIPTION

Figure 1:
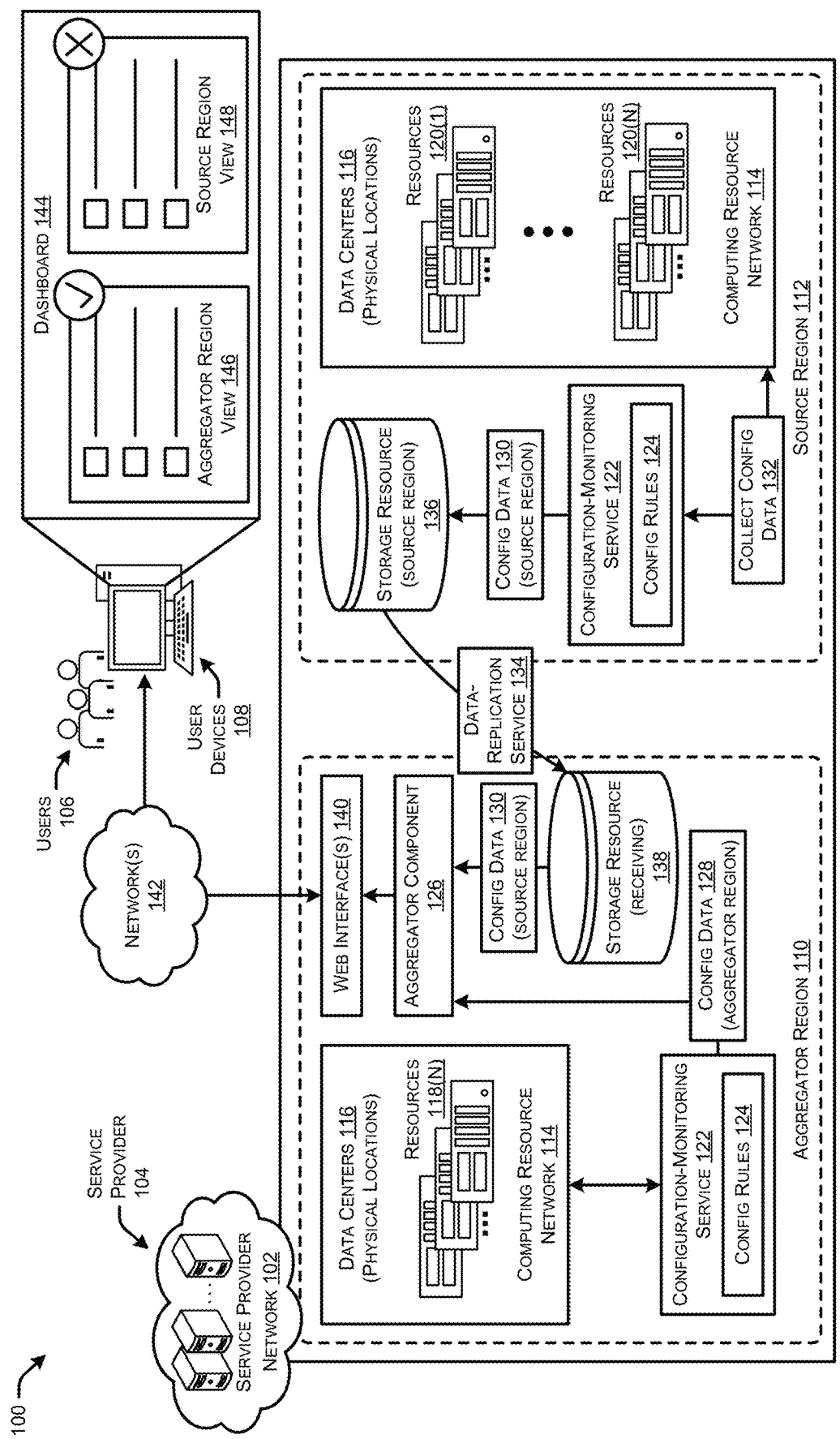
FIG. 1 illustrates a system-architecture diagram of an example environment in which a configuration-monitoring service of a service provider network aggregates configuration data for computing resources located in multiple regions to be accessed using an aggregator account.

Service providers offer various network-based (or "cloud-based") services to users to fulfill computing needs of the users. These service providers may operate service provider networks that include clusters of managed servers stored in data centers located across different geographic regions. In this way, users who have subscribed for use of the network-based services need not invest in and maintain the computing infrastructure required to implement the various services that they may need. An advantage provided by some service providers is that their service provider networks may include data centers located in different geographic regions such that users located in these different geographic regions are provided with access these cloud-based services. To offer these cloud-based services in different geographic regions, service providers operate and maintain regions of data centers, or data centers that are isolated and grouped according to geographic, physical locations of the data centers. These regions may consist of one or more discrete data centers that have redundant power, computing resources, networking, and connectivity such that they are designed to provide services to users while being completely isolated from other regions. In this way, service provider networks may provide users in different geographic regions (e.g., towns, cities, countries, continents, etc.) with scalable, on-demand, and network-accessible computing resources such that the users can subscribe and utilize a service provider to fulfil their computing resource needs, and potentially needs of their own clients, in the different geographic regions.

Users with large computing resource needs, such as different types organizations (e.g., companies, governments, clubs, and/or any other entities comprising multiple people), may have computing needs that include the need to provision computing resources multiple regions of the service provider network, and/or the need to provision multiple types of computing resources offered by the service provider. While the organizations may simply create or register for a single account with the service provider to subscribe for and manage these computing resources, the organizations may create multiple accounts for ease in managing computing resource provisioned in different regions and/or the different types of computing resources. Accounts can provide efficient ways to isolate, govern, and manage computing resources such that the organizations may create and utilize different accounts for different regions and/or different types of resources or services. For example, a global organization may have one or more accounts to manage their resources provisioned in a region for North America, and one or more separate accounts to manage their resources provisioned in another region for Europe.

These organizations may create a team of individuals that setup the accounts according to baseline configuration settings for their resources, and continue to manage and audit the resources in those accounts. As noted above, the service provider network may provide a configuration-monitoring service that enables users to assess, audit, and evaluate the configurations of their computing resources. For example, the configuration-monitoring service may continuously monitor and record the computing resource configurations (including changes), and allow the users to automate the evaluation of recorded configurations against desired configurations to determine overall compliance. However, the configuration-monitoring service may provide the information on an account level such that the auditing information is retrieved individually from each account and/or each region. Accordingly, individuals in an organization that are tasked with managing and auditing resources for all of the accounts of the organization may have to individually access each account to view the configuration information to audit and manage each account. However, retrieving information from each account and/or each region may become unmanageable as the number of accounts that are managed for an organization increases.

This disclosure describes, at least in part, techniques and technologies implemented by a configuration-monitoring service of a service provider network to provide users with the ability to access to configuration data across multiple accounts using a single account, or other centralized location or access point. The configuration-monitoring service may allow users with multiple accounts registered with the service provider network to designate a central account (or "aggregator account") through which the users can access and review configuration data across multiple accounts (or "source accounts") and/or across multiple regions (or "source regions"). After a user has designated an aggregator account in an aggregator region, the configuration-monitoring service may begin collecting configuration data from the source accounts and/or source regions, and transporting the configuration data to the aggregator region to be accessed and viewed using the aggregator account. The user may then access their aggregator account and be presented with a dashboard that displays, using various user interfaces, the configuration data from the source accounts and/or source regions.

As noted above, the configuration-monitoring service may continuously monitor and record configuration data indicating resource configurations for computing resources provisioned for users who have accounts registered with the service provider network. The configuration-monitoring service may monitor and record any type of configuration data for the computing resources of an account, such as the total number computing resources in a region reserved for use by the account, a list of configuration rules defining permissible configurations for the resources, a total number of resources that are compliant and non-compliant with the rules, a number of rules that are being complied with, and/or other configuration data. The configuration-monitoring service may detect changes in configurations of computing resources and in relationships between resources, record those changes, and provide users with compliance data indicating whether or not the changes resulted in configurations no longer complying with configuration rules specified in baseline configuration data. In this way, the configuration-monitoring service may help users with auditing, security analysis, change management, operational troubleshooting, and/or other operations for managing and monitoring configurations for computing resources.

Rather than having users log into each account for which they would like to view all of the different types of configuration data provided by the configuration-monitoring service, the techniques described herein allow for users to opt-in for use of an aggregator for multiple accounts registered with the user. Generally, a user with multiple accounts registered with a service provider network may define different permissions or policies which permit, or restrict, access or operations for the different accounts. For instance, one account registered to a higher-level executive at an organization may have access to an account that is granted higher-level permissions (e.g., admin, master, etc.) to interact with computing resources, whereas a lower-level employee at the organization may have access to an account that is granted lower-level permissions.

According to the techniques described herein, a user may log in to an account with higher-level permissions and request that the configuration-monitoring service generate or create an aggregator for multiple accounts of that user. The user may specify which accounts and/or regions they would like to have configuration data aggregated from by manually typing in account identifiers. In other examples, the user may utilize an account-management service provided by the service provider network that helps organizations with many accounts manage their accounts more efficiently. In such examples, the configuration-monitoring service may pull or identify the accounts for the organization based on the listing of accounts maintained by the account-management service. The user may then select, from amongst the accounts pulled from the account-management service and/or by manual input, which accounts they would like to designate as source accounts and/or which regions are to be source regions. The configuration-monitoring service may then generate an aggregator for the account that the user has designated as the aggregator account such that configuration data from the source accounts/regions is provided to the aggregator account for centralized viewing.

In some examples, the configuration-monitoring service may generate aggregation-mapping data that indicates mappings, routes, associations, etc., between the aggregator account/region and the source accounts/regions. The aggregation-mapping data may comprise metadata that generally represents a set of source accounts and regions whose configuration data is to be aggregated into the aggregator account.

After generating the aggregation-mapping data, the configuration-monitoring service may propagate the aggregation-mapping data to the source regions to inform servers or devices of the configuration-monitoring service in the other region as to which accounts configuration data needs to be synchronized back into the aggregator account/region. In this way, the devices of the configuration-monitoring service in the source regions that generate the configuration data for the source accounts may be informed that they are to transport the configuration data back to the aggregator account/region.

When the devices of the configuration-monitoring service in the source region (or "source-region devices") receive the aggregation-mapping data, they may construct routes from the source accounts and source regions back to the aggregator account/region. Once the route is generated from the source accounts in the source regions back to the aggregator account in the aggregator region, the source-region devices may process and collect the configuration data for the source account(s) in the source region(s) and transport the configuration data back to the aggregator region for the aggregator account.

In some examples, the source-region devices may place the configuration data for the source accounts/region in a storage resource that is configured for cross-region replication of data such that the configuration data is copied from the source storage resource to a destination storage resource in the aggregator region. The cross-region replication may comprise an automated, asynchronous copying of data objects from storage resources in different geographic regions. The source storage resource may designate an aggregator storage resource as a destination storage resource for the configuration data to be replicated, and may also designate the aggregator account as a destination account that is to be provided with the configuration data. The source-region devices may periodically, or continuously, collect and store the configuration data in the source storage location for replication, and/or may collect and store the configuration data based on a trigger event (e.g., user request, detecting a change in configurations for computing resources, etc.).

Once the configuration data has been replicated, or otherwise transported, from the source regions for the source accounts, the aggregator may obtain the configuration data and provide the aggregator account with access to the configuration data. For example, the configuration-monitoring service may provide users of the aggregator account with access to a dashboard that includes one or more user interfaces configured to present configuration data from source regions/accounts, and also configuration data for the aggregator region/account. In some instances, a user of the aggregator account may simply call one or more APIs or other interfaces to receive the configuration data for a source region/account and/or the aggregator region/account.

In this way, users that have registered many accounts with a service provider network, potentially across different regions supported by the service provider network, may designate a single aggregator account for centralized viewing of configuration data across their accounts and/or regions. This may allow administrators of the accounts with increased efficiencies in auditing inventory of computing resources in the accounts, reviewing configuration settings for the computing resources, and/or assessing overall compliance of the computing resources with configuration rules. The techniques described herein help solve a problem rooted in computer technology experienced by users of service provider networks. Specifically, the techniques described herein help remove visibility silos for configuration data of resources for different accounts and/or regions for a service provider network. The techniques include the use of a solution rooted in computer technology, such as the generation of new data, such as aggregation-mapping data, that is provided to devices in various geographic regions in which computing resources of a service provider network are located, and routing/replicating configuration data from source regions back to aggregator accounts/regions. The techniques described herein may reduce the amount of time, server calls, authorization checks, and/or other computing resources previously required to allow administrators of many account to log in to all their accounts to view configuration data.

In some examples, the techniques may be applied across accounts such that data is moved between accounts. In various examples, the techniques may be applied across geographic regions where configuration data is transported from a source region to a destination region. While being described with reference to a configuration-monitoring service, in some examples, the techniques may equally be applied for other services, such as performance monitoring services, event tracking services, and so forth.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a configuration-monitoring service of a service provider network 102 aggregates configuration data for computing resources located in multiple regions to be accessed using an aggregator account.

As illustrated, the service provider network 102 may be operated and/or managed by a service provider 104. The service provider network 102 may provide various services to users 106 to fulfil their computing resource needs, such as cloud-based computing resources. For example, the service provider network 102 may provide cloud-based, scalable, and network accessible compute power services, storage services, database services, and/or other services. Users 106 may utilize user devices 108 to subscribe for use of the computing resources and/or services provided by the service provider network 102.

The service provider network 104 may span across different geographic regions, such as an aggregator region 110 and a source region 112, and comprise a computing resource network 114 that includes clusters of managed servers stored in data centers 116 located across the different geographic regions. In this way, users 106 who have subscribed for use of the network-based services supported by computing resources in the data centers 116 need not invest in and maintain the computing infrastructure required to implement the various services that they may need. In some examples, users 106 of the service provider network 102 may access or utilize computing resources in the data centers 116 located in different geographic regions 110/112 such that users 106 located in these different geographic regions are provided with access these resources and services.

To offer cloud-based services in different geographic regions, service providers 104 operate and maintain the regions 110/112 of data centers 116 such that the data centers 116 that are isolated and grouped according to geographic, physical locations of the data centers 116. These regions 110/112 may consist of one or more discrete data centers 116 that have redundant power, computing resources, networking, and connectivity such that they are designed to provide services to users 106 while being completely isolated from other regions. In this way, the service provider network 102 may provide users in different geographic regions (e.g., towns, cities, countries, continents, etc.) with scalable, on-demand, and network-accessible computing resources such that the users 106 can subscribe and utilize the service provider 104 to fulfil their computing resource needs, and potentially needs of their own clients, in the different geographic regions.

In some examples, the aggregator region 110 and source region 112 may be defined according to other types of boundaries other than geographic boundaries. For example, the aggregator region 110 and/or source region(s) 112 may be defined based on fault tolerance zones and/or availability zones. Stated otherwise, the computing resources in the aggregator region 110 and/or source region 112 may be defined without regard to geographic location, but instead defined based on network availability, fault tolerance zones, availability zones, and/or other logical groupings. In some instances, the aggregator region 110 may include computing resources that are located in a same geographic area, and/or even a same data center, as computing resources of the source region 112. Regardless of how the regions are defined, the configuration data for the aggregator region 110 is traditionally accessible by an aggregator account, and the configuration data for a source region 112 is accessible by a source account (but not the aggregator account).

As illustrated, the aggregator region 110 may include data centers 116 that house resources 118, and the source region 112 may include data centers 116 that house different resources 120. These resources 118/120 may comprise any type of cloud-based resources (e.g., compute, storage, memory, virtual machines, software, security, networking, databases, etc.) that can be utilized to implement or provide cloud-based services to the users 106.

According to the techniques described herein, the service provider network 102 may provide a configuration-monitoring service 122 that enables users 106 to assess, audit, and evaluate the configurations of their computing resources 118/120. For example, the configuration-monitoring service 122 may continuously monitor and record the computing resource configurations 118/120 (including changes), and allow the users 106 to automate the evaluation of recorded configurations against desired configurations (e.g., config rules 124) to determine overall compliance. Generally, the configuration-monitoring service 122 may comprise one or more servers, or other devices and resources, provisioned across the different regions 110/112 to provide auditing and/or other resource configuration monitoring for users 106 with resources 118/120 provisioned in various regions. Rather than having the configuration-monitoring service 122 provide the configuration data 130 to users 106 with accounts that manage the source region 112, the techniques described herein include the configuration-monitoring service 122 transmitting or otherwise sending the config data 130 for the source region 112 to the aggregator region 110 to be viewed by an operator or user 106 of an account that is designated as an aggregator account.

For example, the configuration-monitoring service 122 may allow users 106 with multiple accounts registered with the service provider network 102 to designate a central account (or "aggregator account") through which the users 106 can access and review configuration data 130 across multiple accounts (or "source accounts") and/or across multiple regions (or "source regions 112"). After a user 106 has designated an aggregator account in an aggregator region 110, the configuration-monitoring service 122 may begin collecting configuration data 130 from the source accounts and/or source regions 112, and transporting the configuration data 130 to the aggregator region 110 to be accessed and viewed using the aggregator account. The user 106 may then access their aggregator account 110 and be presented with a dashboard that displays, using various user interfaces, the configuration data from the source accounts and/or source regions.

To generate the configuration data 130, the configuration-monitoring service 122 may receive or determine one or more config rules 124 that define permitted, and required, configurations for the resources 118/120. Many different config rules 124 exist for users 106 to define that are generally known in the art, such as allowed software versions, security policies, encryption of data, and/or other configuration rules 124 known in the art. The configuration-monitoring service 122 may collect config data 132 that indicates configurations of the resources 120 in the source region 112, and compare that raw config data 132 with the config rules 124 to determine compliance data to be included in the config data 130. The config data 130 may comprise various types of configuration data 130, including compliance data. For example, the configuration data 130 may include the total number computing resources 118/120 allocated in a region for use by the account, a list of configuration rules 124 defining permissible configurations for the resources 118/120, a total number of resources 118/120 that are compliant and non-compliant with the rules 124, a number of rules 124 that are being complied with, and/or other configuration data 130.

The configuration-monitoring service 122 may detect changes in configurations of computing resources 118/120 and in relationships between resources 118/120, record those changes, and provide users 106 with compliance data indicating whether or not the changes resulted in configurations no longer complying with configuration rules 124 specified in baseline configuration data. The configuration-monitoring service 122 may be configured to store the configuration data 130 for the source region 112 in one or more storage resources 136 (or storage locations) located in the source region 112. The storage resources 136 may be data storage resources that are configured for cross-region replication of data such that the configuration data 130 is copied from the source storage resource 136 to a receiving storage resource 138 in the aggregator region 110. The cross-region replication may be performed by a data-replication service 134 that may comprise an automated, asynchronous copying of data objects from storage resources 136 in different regions 110/112. The source storage resource 130 may designate an aggregator storage resource 138 as a destination/receiving storage resource 138 for the configuration data 130 to be replicated, and may also designate the aggregator account as a destination account that is to be provided with the configuration data 130. The configuration-monitoring service 122 may periodically, or continuously, collect and store the configuration data 130 in the source storage location 136 for replication, and/or may collect and store the configuration data 130 based on a trigger event (e.g., user request, detecting a change in configurations for computing resources, etc.).

In some examples, the configuration-monitoring service 122 may similarly collect configuration data 128 for the aggregator region and provide that configuration data 128 to be viewed by a user 106 of the aggregator account. Thus, once the configuration data 130 has been replicated, or otherwise transported, from the source regions 112 for the source accounts, the aggregator component 126 may obtain the configuration data 130 and provide the aggregator account with access to the configuration data 130. Additionally, the aggregator account may be provided with access to the configuration data 128 for the aggregator region 110 as well.

In some examples, one or more web interfaces 140 may be utilized to provide the users 106 with access to the configuration data across regions and/or accounts. The web interfaces 140 may comprise any type of web interface 140, such as web-based APIs, web-based CLIs, and/or web consoles that provide a dashboard 144 that includes one or more user interfaces. The users 106 may utilize their user devices 108 (e.g., mobile phones, tablets, personal computing devices, servers, televisions, and/or any other computing device) to access, over one or more networks 142 (e.g., WANs, PANs, LANs, etc.), the web interfaces 140 to access and view the configuration data 130 for the source region, and the configuration data 128 for the aggregator region 110. In some examples, the users 106 be presented with a dashboard 144 that they may interact with to view the configuration data 128 and 130 through one or more user interfaces, such as an aggregator region view 146 and a source region view 148. Any type of configuration data 130 and/or 128 may be presented, and using any number of user interfaces via the dashboard 144.

In this way, users 106 that have registered many accounts with a service provider network 102, potentially across different regions 110/112 supported by the service provider network 102, may designate a single aggregator account for centralized viewing of configuration data 128/130 across their accounts and/or regions.

Figure 2:
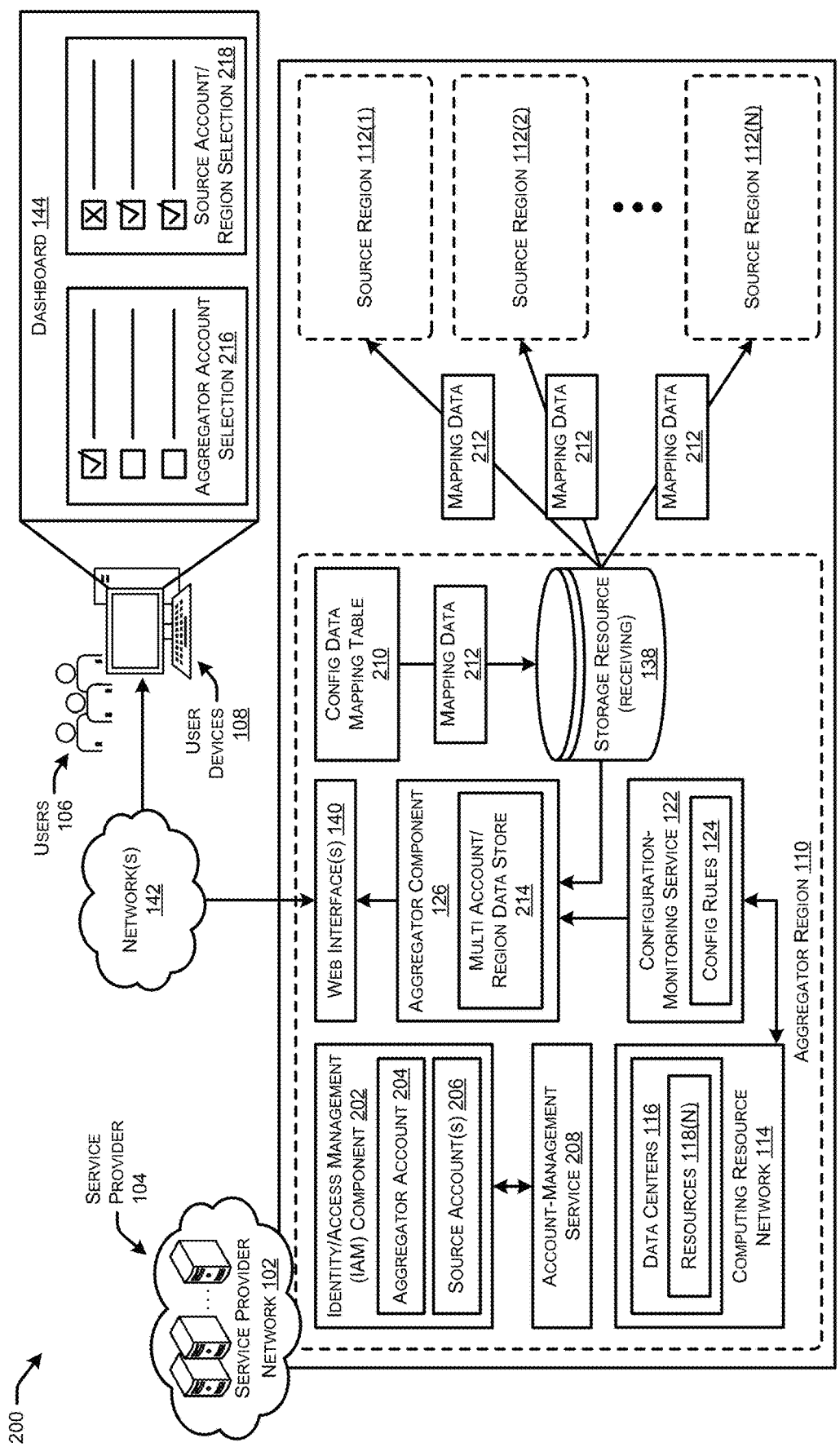
FIG. 2 illustrates a system-architecture diagram of an example environment in which a configuration-monitoring service of a service provider network provides mapping data to source regions. The mapping data indicates an aggregator account in an aggregator region to which the source regions are to provide configuration data for computing resources.

FIG. 2 illustrates a system-architecture diagram of an example environment 200 in which a configuration-monitoring service 122 of a service provider network 102 provides mapping data to source regions 112. The mapping data indicates an aggregator account 204 in an aggregator region 110 to which the source regions 112 are to provide configuration data 130 for computing resources 120.

To utilize the services provided by the service provider network 102, users 106 may register for accounts with the service provider network 102. For instance, users 106 may utilize a device 108 to interact with an identity and access management (IAM) component 202 that allows the users 106 to create an account with the service provider network 102. Generally, the IAM component 202 may enable the users 106 to manage access to their cloud-based services and computing resources securely. Using the IAM component 202, the users 106 may designate permissions for different accounts, such as master or admin accounts with additional permissions to view data for many accounts an organization, and a low-level account may have lower level permissions to view data and perform commands.

In some examples, a user 106 may log in to an account with higher-level permissions and request that the configuration-monitoring service 122 generate or create an aggregator component 126 for multiple accounts of that user 106. The user 106 may specify that the master account is an aggregator account 204 that the aggregator component 126 collects configuration data for from one or more source regions 112. The aggregator component 126 may comprise a resource type of the service provider network 102 configured to aggregate and/or format configuration data from source regions 112 (and/or source accounts 206) and the aggregator region 110.

The user 106 may further designate source accounts 206 and/or source regions 112 from which configuration data for computing resources are to be collected overtime and aggregated back to the aggregator component 126 of the aggregator account 204. In some examples, the user 106 may manually input the account numbers for the aggregator account 204 and the source account(s) 206 and/or use a text file, while in other examples, the user 106 may be an organization that utilizes an account-management service 208 to manage their accounts. The account-management service 208 may allow users 106 to create groups of accounts, create accounts, and apply and manage policies for accounts. Thus, the account-management service 208 may already have a listing of all accounts registered to the user 106 (or "entity") from which the user 106 may select.

In some examples, the user 106 may perform authorization steps to authorize the aggregator account 204 with the source account(s) 206. For example, the user 106 may have to authorize the aggregator account 204 with the source account(s) 206 before the source account(s) 206 begin collecting and transmitting configuration data 130 to the aggregator account 204. The aggregator account 204 may be authorized using various methods. For example, after the user 106 has indicated the source account(s) 206 using the aggregator account 204, the IAM component 202 may send authorization requests to each of the source account(s) 206 that the user 106 indicated. The user 106 (or other users 106 that can access the source account(s) 206) may log in to the source account(s) 206 and approve, or disapprove, the authorization requests for the aggregator account 204 to be provided with access to the configuration data 130 from the source account(s) 206 (and/or regions). Once the source account(s) 206 provide the aggregator account 204 with permission or authorization to access the configuration data 130, the aggregator component 126 may begin collecting the configuration data 130 from the source account(s) 206. In some instances, prior to receiving an authorization request from the aggregator account 204, the source account(s) 206 may be utilized by a user 106 to list one or more accounts that are authorized to receive the configuration data 130 from the source account(s) 206. In this way, an aggregator account 204 may be on a "whitelist" of authorized accounts for the source account(s) 206 such that the aggregator account 204 need not send an authorization request to the source account(s) 206 because it is already pre-authorized to receive and access the configuration data 130 from the source account(s) 206. In even further examples, one or more of of the accounts listed in the account-management service 208 as belonging to a group or entity (e.g., organization) may be pre-authorized to serve as aggregator accounts 204 for the source account(s) 206.

Once the user 106 has designated their aggregator account 204 and source account(s) 206 and/or source regions 112, the aggregator component 126 may store, in a configuration data mapping table 210, mapping data 212 that indicates mappings, routes, associations, etc., between the aggregator account/region and the source accounts/regions. The mapping data 212 may comprise metadata that generally represents a set of source accounts 206 and source regions 112 whose configuration data is to be aggregated into the aggregator account 204.

After generating the mapping data 212, the configuration-monitoring service 112 may propagate the mapping data 112 to the source regions 112 and/or source accounts 206 to inform servers or devices of the configuration-monitoring service 112 in the other regions 112 as to which source accounts' 206 configuration data needs to be synchronized back into the aggregator account/region. In this way, the devices of the configuration-monitoring service 112 in the source regions 112 that generate the configuration data for the source accounts 206 may be informed that they are to transport the configuration data back to the aggregator account/region.

When the devices of the configuration-monitoring service 112 in the source region 112 receive the mapping data 212, they may construct routes from the source accounts 206 and source regions 112 back to the aggregator account/region. Once the route is generated from the source accounts 206 in the source regions 112 back to the aggregator account 204 in the aggregator region 110, the configuration-monitoring service 112 may process and collect the configuration data for the source account(s) 206 in the source region(s) 112 and transport the configuration data back to the aggregator region 110 for the aggregator account 204.

The aggregator component 126 may receive the configuration data 128/130 and store in in a multi account/region data store 214, and format it to be accessible by the user devices 108 via the web interface(s) 140 for centralized viewing using the aggregator account 204.

As described herein, the service provider network 102 and the configuration-monitoring service 122 may include one or more hardware processors (processors) configured to execute one or more stored instructions, such as instructions to perform actions taken by the components and services described herein. The processor(s) may comprise one or more cores. Further, the service provider network 102 and the configuration-monitoring service 122 may include one or more network interfaces configured to provide communications between the service provider network 102, the configuration-monitoring service 122 and other devices, such as the user device(s) 108. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The service provider network 102 and the configuration-monitoring service 122 may also include computer-readable media that stores various executable components (e.g., software-based components, firmware-based components, etc.). In addition to various components discussed in FIGS. 1 and 2, the computer-readable-media may further store components to implement functionality described herein. While not illustrated, the computer-readable media may store one or more operating systems utilized to control the operation of the one or more devices that comprise the service provider network 102 and the configuration-monitoring service 122. According to one embodiment, the operating system comprises the LINUX operating system. According to another embodiment, the operating system(s) comprise the WINDOWS® SERVER operating system from MICROSOFT Corporation of Redmond, Wash. According to further embodiments, the operating system(s) can comprise the UNIX operating system or one of its variants. It should be appreciated that other operating systems can also be utilized.

The computer-readable media may be used to store and retrieve information, such as program modules, data structures, or other data. It should be appreciated by those skilled in the art that computer-readable storage media is any available media that provides for the non-transitory storage of data and that can be accessed by the service provider network 102 and the configuration-monitoring service 122. In some examples, the operations performed by the service provider network 102 and the configuration-monitoring service 122, and or any components included therein, may be supported by one or more server devices. Stated otherwise, some or all of the operations performed by the service provider network 102 and the configuration-monitoring service 122, and or any components included therein, may be performed by one or more computer devices operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 3:
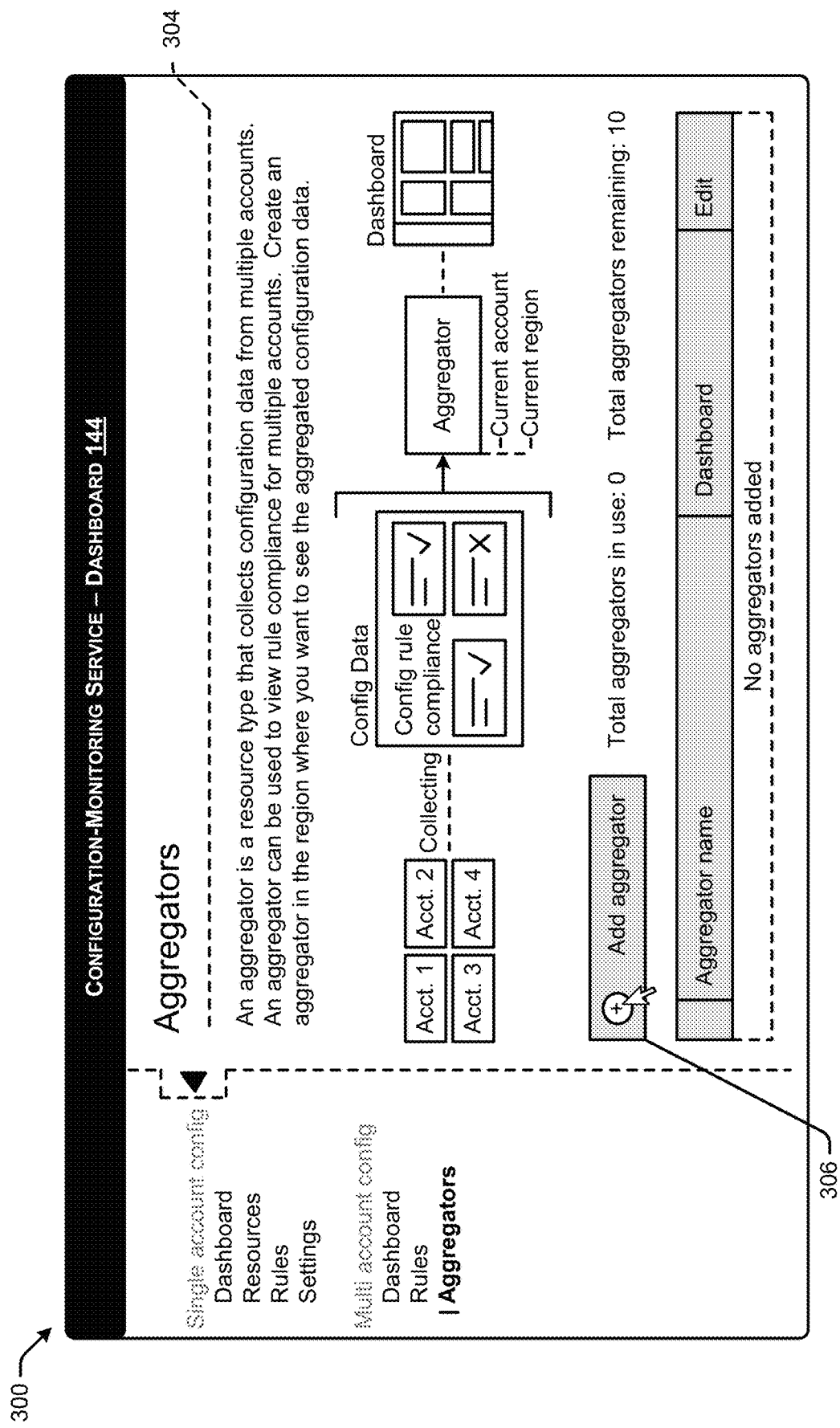
FIG. 3 illustrates a graphical user interface through which a user of a service provider network can create an aggregator that collects configuration data for computing resources across different accounts and/or regions.

FIG. 3 illustrates a graphical user interface (GUI) 300 through which a user 106 of a service provider network 102 can create an aggregator 126 that collects configuration data for computing resources 118/120 across different accounts and/or regions.

The GUI 300 may be presented via the dashboard 144 and include one or more user interfaces through which the user 106 can provide input to create an aggregator component 126. The GUI 300 may include aggregator information 302 including a description and illustration to demonstrate how an aggregator component 126 works for the user 106. The aggregator information 302 may further show how many aggregators 126 are in use for the user 106, and how many aggregators 126 are remaining for use. The user 106 may provide input indicating a selection of an add aggregator option 306 to add an aggregator for their accounts that collects configuration data across accounts and/or regions for centralized viewing.

Figure 4:
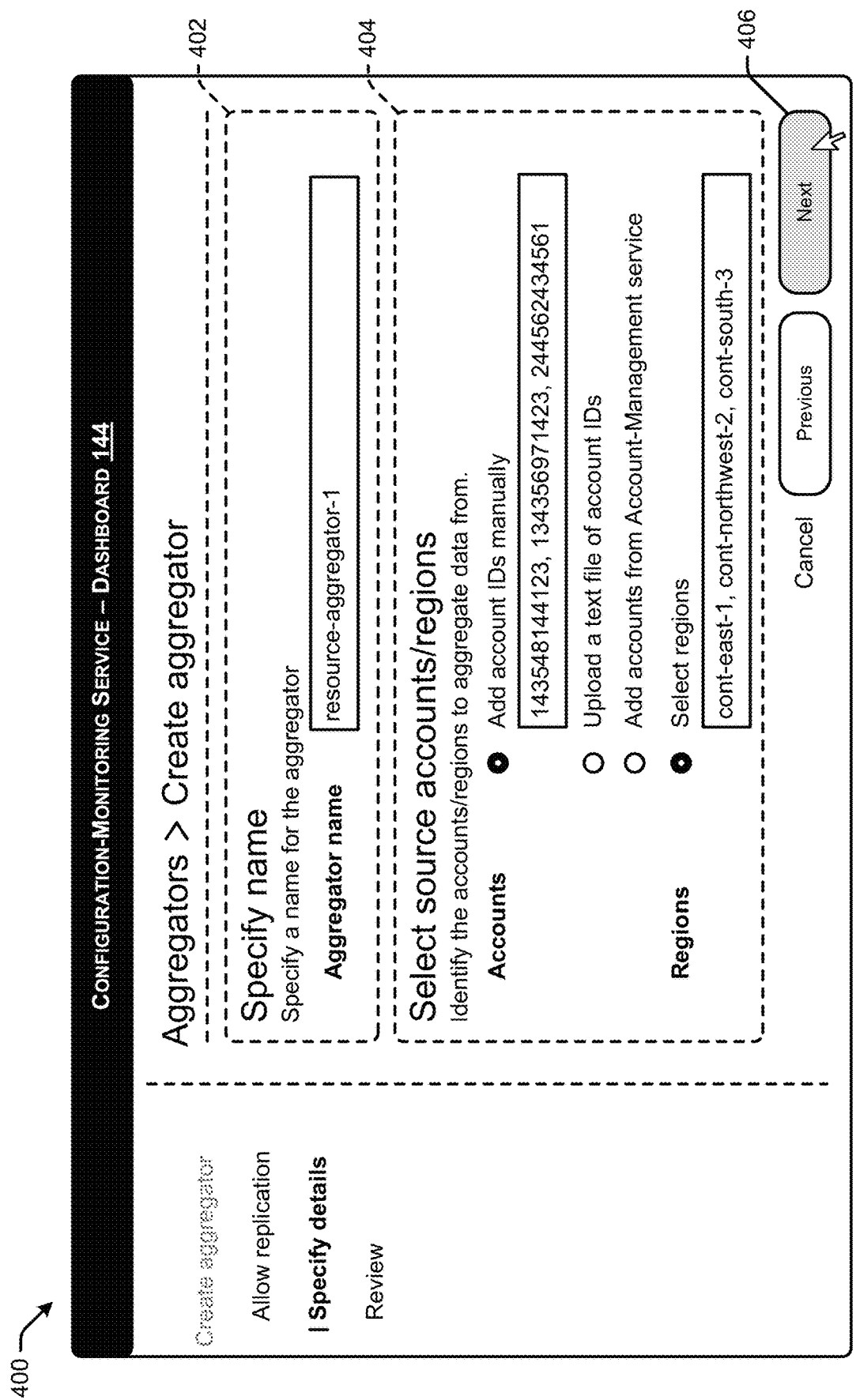
FIG. 4. illustrates a graphical user interface through which a user of a service provider network can specify a name for an aggregator, as well as source accounts from which the aggregator is to receive configuration data.

FIG. 4. illustrates a graphical user interface 400 through which a user 106 of a service provider network 102 can specify a name for an aggregator 126, as well as source accounts 206 from which the aggregator 126 is to receive configuration data 128/130.

The GUI 400 may be presented via the dashboard 144 and include one or more user interfaces through which the user 106 can provide input to create an aggregator component 126. The GUI 400 may include a specify name area 402 through which the user 106 may specify a name for the aggregator 126, and also a select source accounts are 404 where the user 106 can indicate which of their accounts are to be source accounts 206. The user 106 may input the source accounts 206 manually, upload a text file of account IDs for the source accounts 206, and/or add accounts pulled from an Organizations service (e.g., account-management service 208) to select source accounts 206 from the listing of all accounts registered for the user 106 or entity. Additionally, or alternatively, the user 106 may designate regions from which they would like to have configuration data 130 received from for access by the aggregator account 206. For instance, the user 106 can specify the source accounts 206 from which configuration data 130 is aggregated for access by the aggregator account 204, and further specify specific regions (e.g., geographic regions) from which the configuration data 130 is to be aggregated. In this way, the user 106 may designate one or more specific regions, but not other regions, from which configuration data 130 is to be aggregated from a source account 206. In some instances, the user 106 may select an option where all regions associated with a source account 206 have configuration data 130 collected therefrom. Thus, each source account 206 may be associated with multiple regions (e.g., manage resources located in multiple regions), and select one or more of the regions from which configuration data 130 is to be aggregated for access by the aggregator account 204. The user 106 can then provide input to select a next option 406 to move on in creating the aggregator 126.

Figure 5:
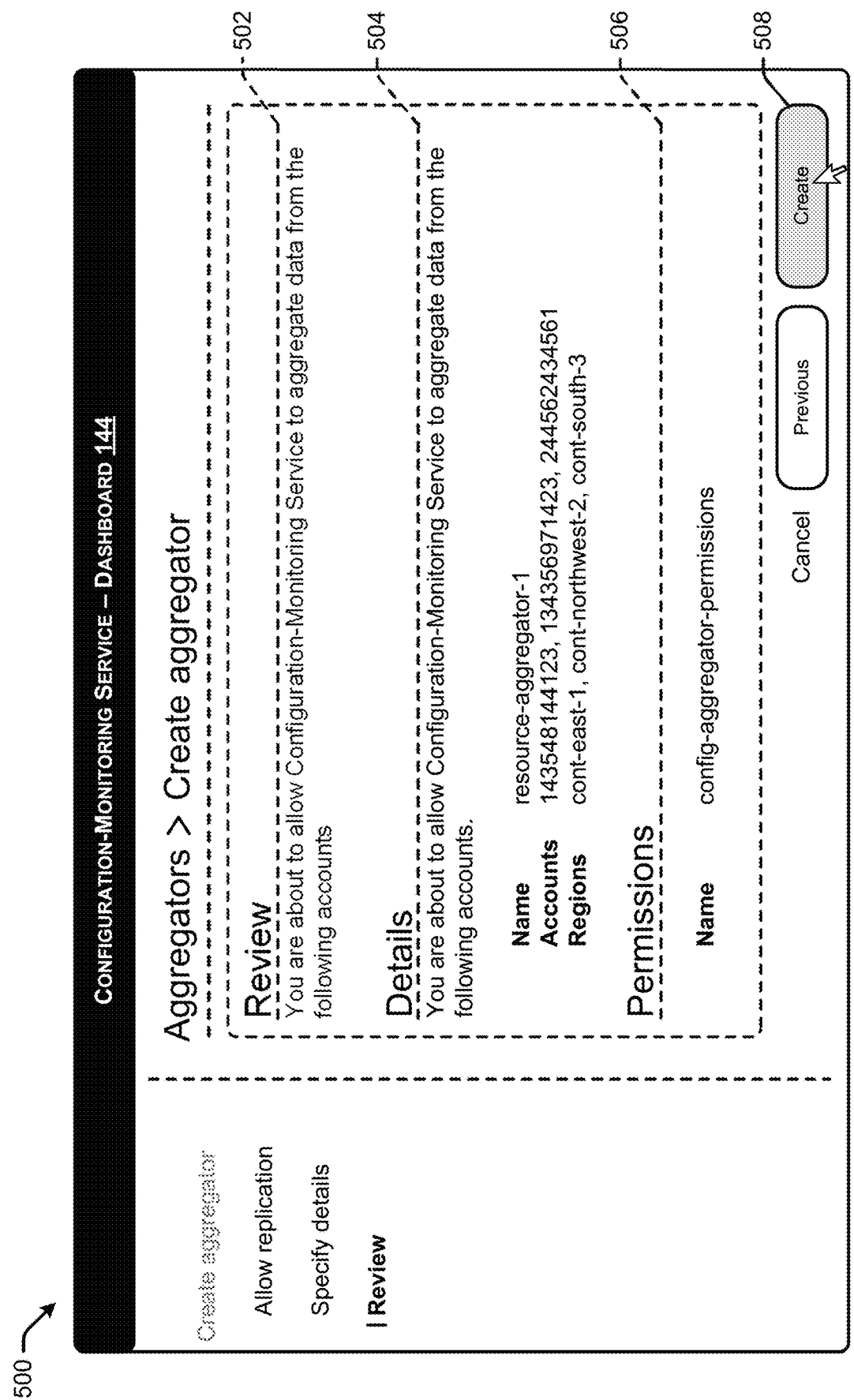
FIG. 5 illustrates a graphical user interface through which a user of a service provider network can review details about their aggregator, and create their aggregator.

FIG. 5 illustrates a graphical user interface 500 through which a user 106 of a service provider network 102 can review details about their aggregator 126, and create their aggregator 126.

The GUI 500 may be presented via the dashboard 144 and include one or more user interfaces through which the user 106 can provide input to create an aggregator component 126. The GUI 500 may include a review area 502 that explains to the user 106 they have a chance to review their aggregator 126 before creating it. The GUI 500 may further include a details area 504 that indicates details for the aggregator 126, such as a name and IDs for source accounts 206. The GUI 500 may further include a permissions area 506 that indicates what permissions the aggregator account 204 is granted. In some examples, the permissions grated to the aggregator account 204 may restrict and/or permit the type of configuration data that may be aggregated to the aggregator account 204. Additionally, the GUI 500 may include a create option 508 that the user 106 may select to create their aggregator 126 for their aggregator account 204.

Figure 6:
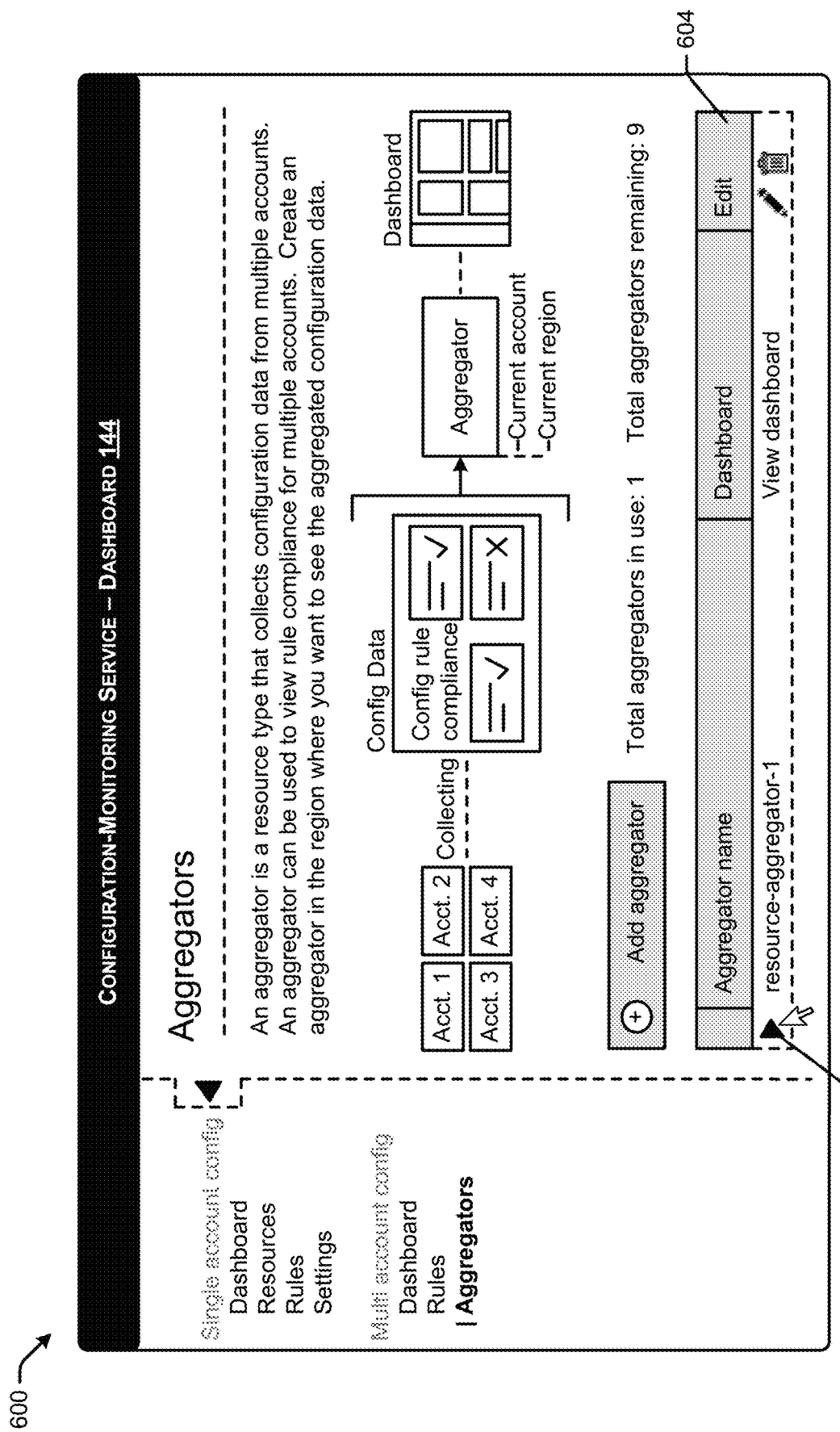
FIG. 6 illustrates a graphical user interface through which a user of a service provider network can select an aggregator from a listing of their aggregators to view details for the selected aggregator.

FIG. 6 illustrates a graphical user interface 600 through which a user 106 of a service provider network 102 can select an aggregator 126 from a listing of their aggregators 126 to view details for the selected aggregator 126.

The GUI 600 may be presented via the dashboard 144 and include one or more user interfaces through which the user 106 can provide input to view details for a selected aggregator component 126. As illustrated, the GUI 600 may include a details caret 602 that, if selected by a user 106, reveals details for the specific aggregator in a listing of aggregators 126 for the user 106. However, in this case the user 106 has only created on aggregator 126 thus far. The GUI 600 may further include an edit area 604 that the user 106 can provide input into to edit the aggregator 126, such as a garbage can to delete the aggregator 126 and/or a pencil to edit the aggregator 126.

Figure 7:
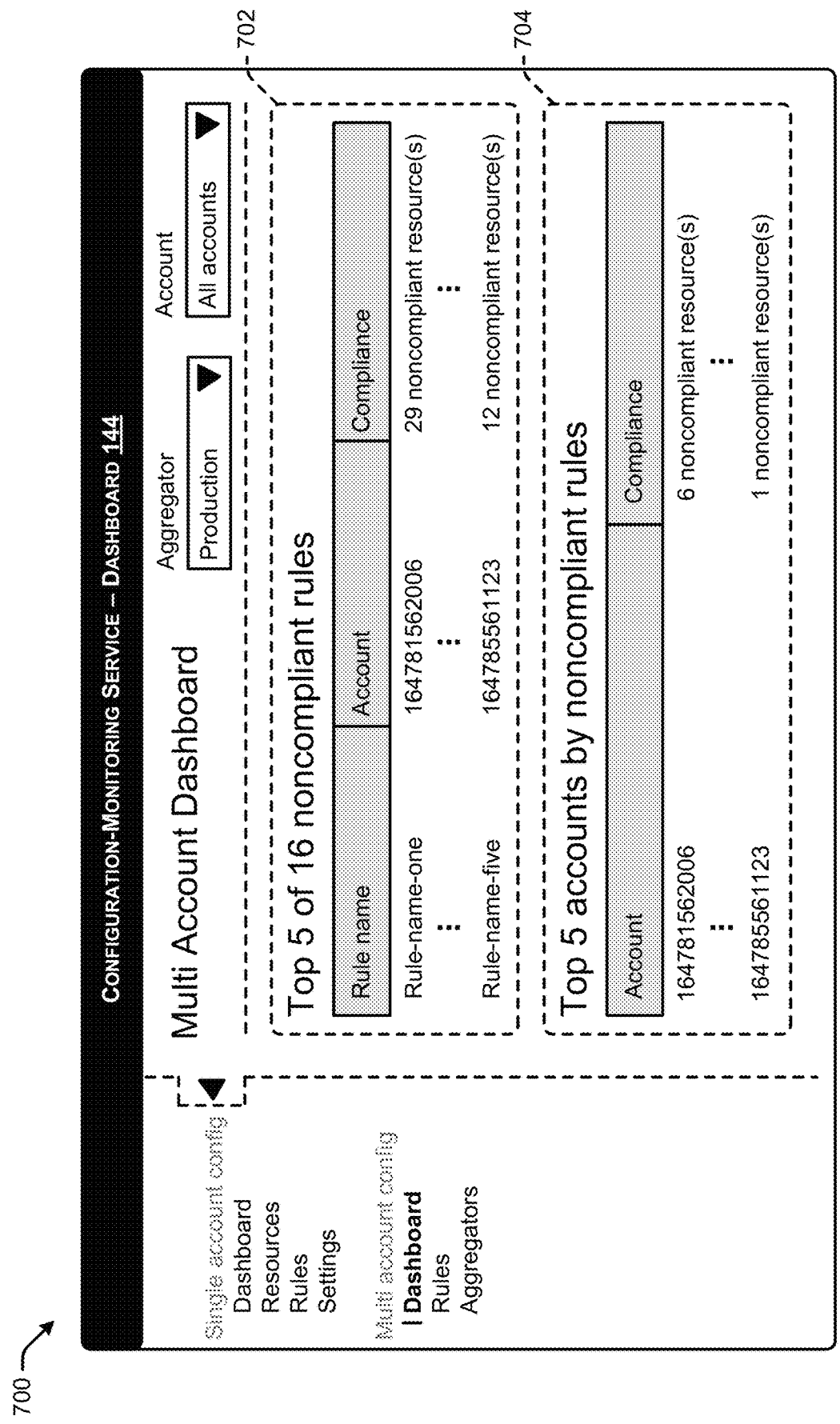
FIG. 7 illustrates a graphical user interface through which a user of a service provider network can view a specific aggregator for an aggregator account, and view configuration data such as compliance data.

FIG. 7 illustrates a graphical user interface 700 through which a user 106 of a service provider network 102 can view a specific aggregator 126 for an aggregator account 204, and view configuration data such as compliance data.

The GUI 700 may be presented via the dashboard 144 and include one or more user interfaces through which the user 106 can view configuration data for source accounts 206 and/or source regions 112. As shown, the GUI 700 may include a noncompliant rules area 702 that lists the configuration rules 124 that are not being complied with by resources, the number of resources that are no complying with the rules 124, and the source account 206 for the resources. The GUI 700 may further include a listing of the top accounts by noncompliant rules are 704 that lists the source accounts 206 in order of how many noncompliant resources they manage. GUI 700 is merely illustrative, and any type of GUI may be presented that displays any type of configuration data including compliance data.

FIGS. 8A, 8B, 9, and 10 illustrate flow diagrams of example methods 800, 900, and 1000 that illustrate aspects of the functions performed at least partly by the service provider network 102 as described in FIGS. 1-7. The logical operations described herein with respect to FIGS. 8A, 8B, 9, and 10 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 8A, 8B, 9, and 10 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 8A:
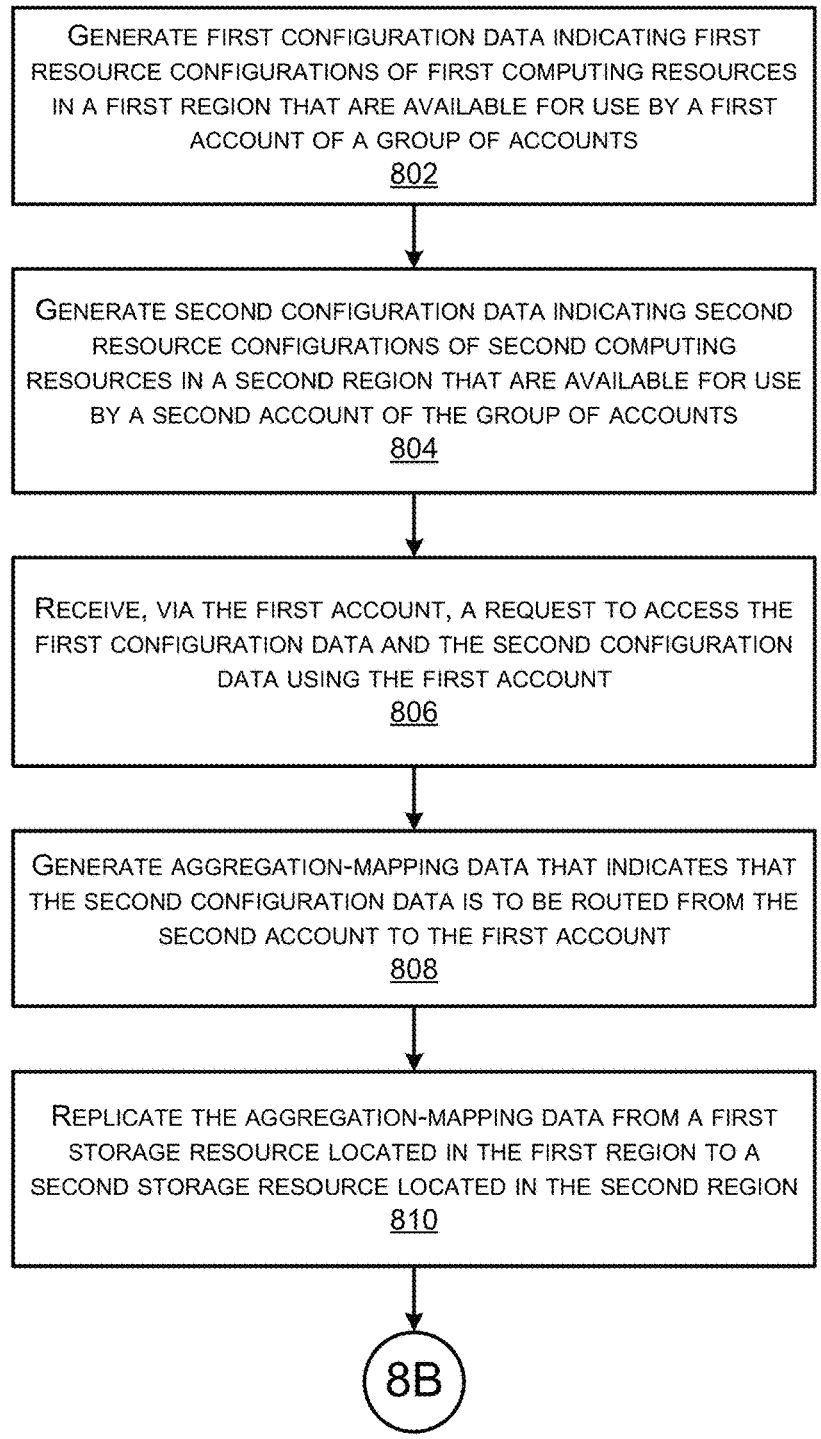
FIGS. 8A and 8B collectively illustrate a flow diagram of an example method for a configuration-monitoring service to provide a source region with mapping data indicating an aggregator account, receiving configuration data from the source account, and providing a user with access to the configuration data of the source region via a web-based dashboard.
Figure 8B:
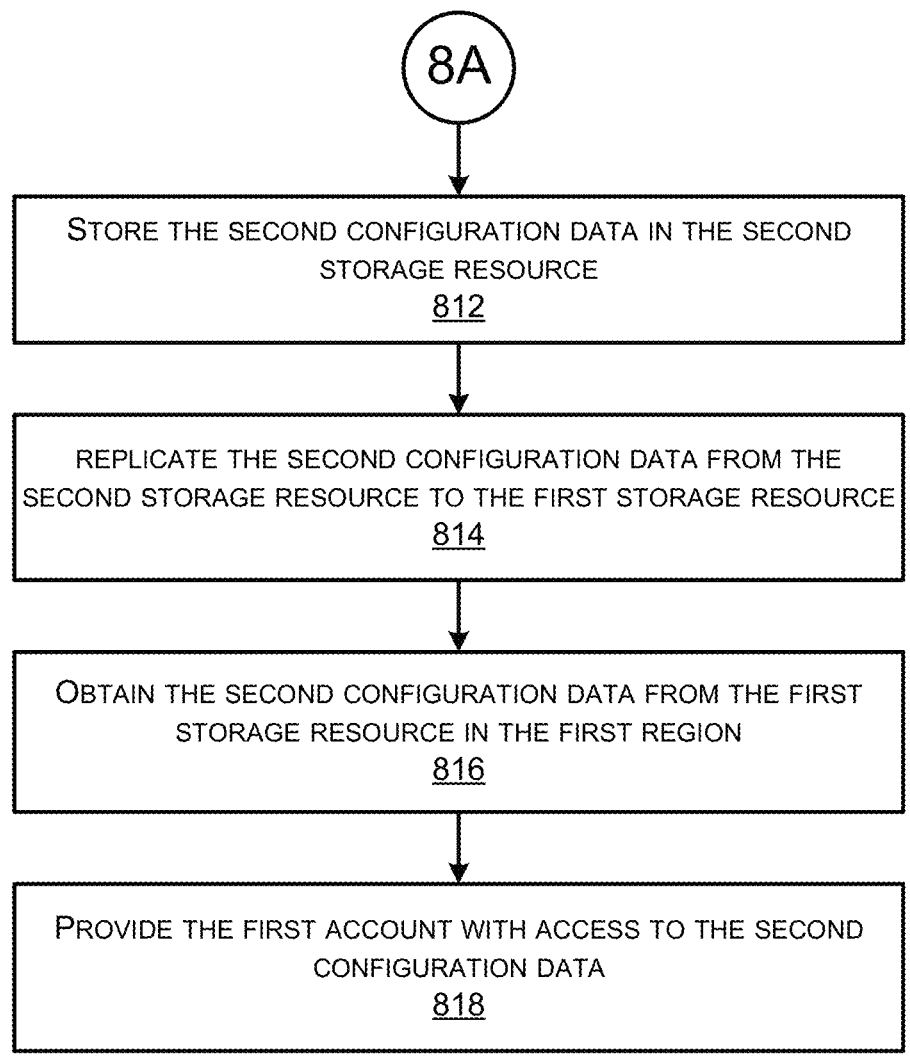

FIGS. 8A and 8B collectively illustrate a flow diagram of an example method 800 for a configuration-monitoring service 122 to provide a source region 112 with mapping data 212 indicating an aggregator account 204, receiving configuration data 130 from the source region 112, and providing a user 106 with access to the configuration data 130 of the source region 112 via a web-based dashboard 144.

In some examples, the techniques of method 800 are performed using a system that includes a computing resource network 114 of a service provider network 102 that is managed by a service provider 102. The computing resource network 114 may comprising first computing resources 118 in a first region 110 available for use by a first account 204 of a group of accounts, and second computing resources 120 in a second region 112 available for use by a second account 206 of the group of accounts. The group of accounts may be registered with the service provider network by a single entity e.g., an organization, single user 106, grouping of individuals, etc.).

In some examples, the first region and second region may be geographic regions such that computing resources located in each of the first region and second region are geographically disparate from each other and grouped (and/or isolated) according to or based on geographic boundaries. In some examples, the regions may be defined according to other types of boundaries other than geographic boundaries. For example, the first region and/or second region may be defined based on fault tolerance zones and/or availability zones. Stated otherwise, the computing resources in the first region and/or second region may be defined without regard to geographic location, but instead defined based on network availability, fault tolerance zones, availability zones, and/or other logical groupings.

The system my further include a configuration-monitoring service 122 of the service provider network 102, where the configuration-monitoring service comprises one or more processors and one or more computer-readable media storing computer-executable instructions that, when executed by the one or more processors, cause the one or more processors to perform operations of method 800.

At 802, the configuration-monitoring service 122 may generate first configuration data indicating first resource configurations of the first computing resources. For example, the configuration-monitoring service 122 may generate configuration data 128 for an aggregator region 110 that indicates resource configurations for the first computing resources 118. The configuration data 128 may indicate other types of data, in some examples. The configuration-monitoring service 122 may generate the configuration data 128 by analyzing the resources 118 and their configurations, and may detect changes in configurations.

At 804, the configuration-monitoring service 122 may generate second configuration data indicating second resource configurations of the second computing resources. For example, the configuration-monitoring service 122 may generate configuration data 130 for a source region 112 that indicates resource configurations for the second computing resources 120. The configuration data 130 may indicate other types of data, in some examples. The configuration-monitoring service 122 may generate the configuration data 130 by analyzing the resources 120 and their configurations, and may detect changes in configurations.

At 806, the configuration-monitoring service 122 may receive, via the first account, a request to view the first configuration data and the second configuration data using the first account. For instance, the configuration-monitoring service 122 may receive, from an aggregator account 204, a request to view the configuration data 128 and 130 using a web interface 140, such as a dashboard 144, API(s), and/or other electronic means. In some instances, the aggregator account 204 may be requesting that an aggregator component 126 be created for the aggregator account 204. The aggregator account 204 may further be utilized to indicate source accounts 206 and/or source regions 112.

At 808, the configuration-monitoring service 122 may generate aggregation-mapping data that indicates that the second configuration data is to be routed from the second account to the first account. For instance, the configuration-monitoring service 122 may create the mapping data 212 that indicates mappings between source accounts 206 and/or source regions 112, and the aggregator account 204 and/or aggregator region 110.

At 810, the configuration-monitoring service 122 may replicate the aggregation-mapping data from a first storage resource located in the first region to a second storage resource located in the second region. For instance, the mapping data 212 may be placed into the storage resource 138 in the aggregator region 110, and replicated into storage resources 136 for the source regions 112. In some examples, the mapping data 212 may be sent or transported from the aggregator region 110 to the source regions 112 using any communication means.

At 812, the configuration-monitoring service 122 may, based on the aggregation-mapping data, store the second configuration data in the second storage resource. For instance, the configuration-monitoring service 122 may determine that the mapping data 212 indicates that configuration data 130 in source regions 112 are to be sent back to an aggregator region 110 and store the config data 130 in the storage resource 136 in the source region 112.

At 814, the configuration-monitoring service 122 may replicate the second configuration data from the second storage resource to the first storage resource. For example, a data-replication service 134 associated with the configuration-monitoring service 122 may replicate (e.g., copy) the data from the storage resource 136 to the storage resource 138.

At 816, the configuration-monitoring service 122 may obtain the second configuration data from the first storage resource in the first region. In some examples, the configuration-monitoring service 122 may read the config data 130 from the storage resource 138 in the aggregator region 110 and place it into the multi account/region store 214.

At 818, the configuration-monitoring service 122 may provide the first account with access to the second configuration data. For instance, the aggregator account 204 may be provided access, via the web interface 140, API(s), and/or other means, to the second configuration data 130, in some instances, along with the config data 128.

In some examples, the second figuration data 130 may include at least one of a first indication of the second computing resources in the second region available for use by the second account, a second indication of configuration rules defining permissible configurations of the second computing resources, a third indication of a number of the second computing resources that are in compliance with configuration rules that define permissible configurations for the second computing resources, or a fourth indication of a number of configuration rules that are being complied with by the second computing resources.

In some instances, the configuration-monitoring service 122 may further perform operations in method 800. For example, the configuration-monitoring service 122 may detect a change in the second resource configurations of the second computing resources, generate third configuration data indicating third resource configurations of the second computing resources in the second region, wherein the third resource configurations differ from the second resource configurations based at least in part on the change, replicate the third configuration data from the second storage resource to the first storage resource, and provide the first account with access to the third configuration data via the web-based dashboard.

In some examples, the computing resource network 114 may further comprise third computing resources in a third region available for use by a third account of the group of accounts, and the aggregation-mapping data further indicates that third configuration data indicating third resource configurations of the third computing resources is to be routed from the third account associated with the third region to the first account in the first region.

FIG. 9 illustrates a flow diagram of an example method 900 for a configuration-monitoring service 122 to aggregate configuration data 130 from a source region 112 to an aggregator account 204 in an aggregator region 110, and provide access to the source configuration data 130 to a user of the aggregator account 204.

At 902, the configuration-monitoring service 122 may identify a first account and a second account registered with a service provider network on behalf of an entity, the first account being associated with first computing resources in a first region of the service provider network and the second account being associated with second computing resources in a second region of the service provider network.

In some examples, the first region and second region may be geographic regions such that computing resources located in each of the first region and second region are geographically disparate from each other and grouped (and/or isolated) according to or based on geographic boundaries. In some examples, the regions may be defined according to other types of boundaries other than geographic boundaries. For example, the first region and/or second region may be defined based on fault tolerance zones and/or availability zones. Stated otherwise, the computing resources in the first region and/or second region may be defined without regard to geographic location, but instead defined based on network availability, fault tolerance zones, availability zones, and/or other logical groupings.

At 904, the configuration-monitoring service 122 may store, in a first storage location in the first region, first configuration data associated with first resource configurations of the first computing resources, the first account having access to the first configuration data.

At 906, the configuration-monitoring service 122 may store, in a second storage location in the second region, second configuration data associated with second resource configurations of the second computing resources, the second account having access to the second configuration data. For instance, the configuration-monitoring service 122 may determine that the mapping data 212 indicates that configuration data 130 in source regions 112 are to be sent back to an aggregator region 110 and store the config data 130 in the storage resource 136 in the source region 112.

At 908, the configuration-monitoring service 122 may send the second configuration data from the second storage location in the second region to at least one of the first storage location or a third storage location in the first region. For example, a data-replication service 134 associated with the configuration-monitoring service 122 may replicate (e.g., copy) the data from the storage resource 136 to the storage resource 138.

At 910, the configuration-monitoring service 122 may provide the first account with access to the second configuration data. For instance, the aggregator account 204 may be provided access, via the web interface 140, to the second configuration data 130, in some instances, along with the config data 128.

In some examples, as part of method 900, the configuration-monitoring service 122 may further receive a request that the first account be provided with access to the second configuration data associated with the second resource configurations of the second computing resources, and identify a set of permissions associated with the first account, wherein the set of permissions grant the first account with access to the second configuration data.

In some examples, as part of method 900, the configuration-monitoring service 122 may further receive a request that the first account be provided with access to additional configuration data associated with additional accounts registered with the service provider, determine that the first account is included in a group of accounts associated with the entity and defined using an account-management service associated with the service provider network, provide the first account with a listing of the group of accounts, and receive input data indicating a selection of at least the second account from the listing of the group of accounts.

In some examples, as part of method 900, the configuration-monitoring service 122 may further determine that a period of time has passed from sending the second configuration data to the first storage location in the first region, generate third configuration data indicating third resource configurations of the second computing resources, and based at least in part on the period of time passing, send the third configuration data to the first storage location in the first region.

In some examples, as part of method 900, the configuration-monitoring service 122 may further detect a change in the second resource configurations of the second computing resources, generate third configuration data indicating third resource configurations of the second computing resources in the second region, wherein the third resource configurations differ from the second resource configurations based at least in part on the change, and send the third configuration data from the second storage location to the first storage location.

In some examples, as part of method 900, the configuration-monitoring service 122 may further receive an indication that the first account is to be provided with the second configuration data from the second region, generate mapping data indicating that the second configuration data is to be routed from the second account associated with the second region to the first account, and send the mapping data to a device in the second region.

In some examples, as part of method 900, the configuration-monitoring service 122 may further, prior to sending the second configuration data, determine at least one of an amount of data stored in the second storage location is greater than or equal to a threshold amount of data, or a threshold period of time has passed from a previous time at which configuration data was previously sent from the second storage location to the first storage location. In such examples, sending the second configuration data from the second storage location to the first storage location may comprise replicating the second configuration data from the second storage location to the first storage location.

Figure 10:
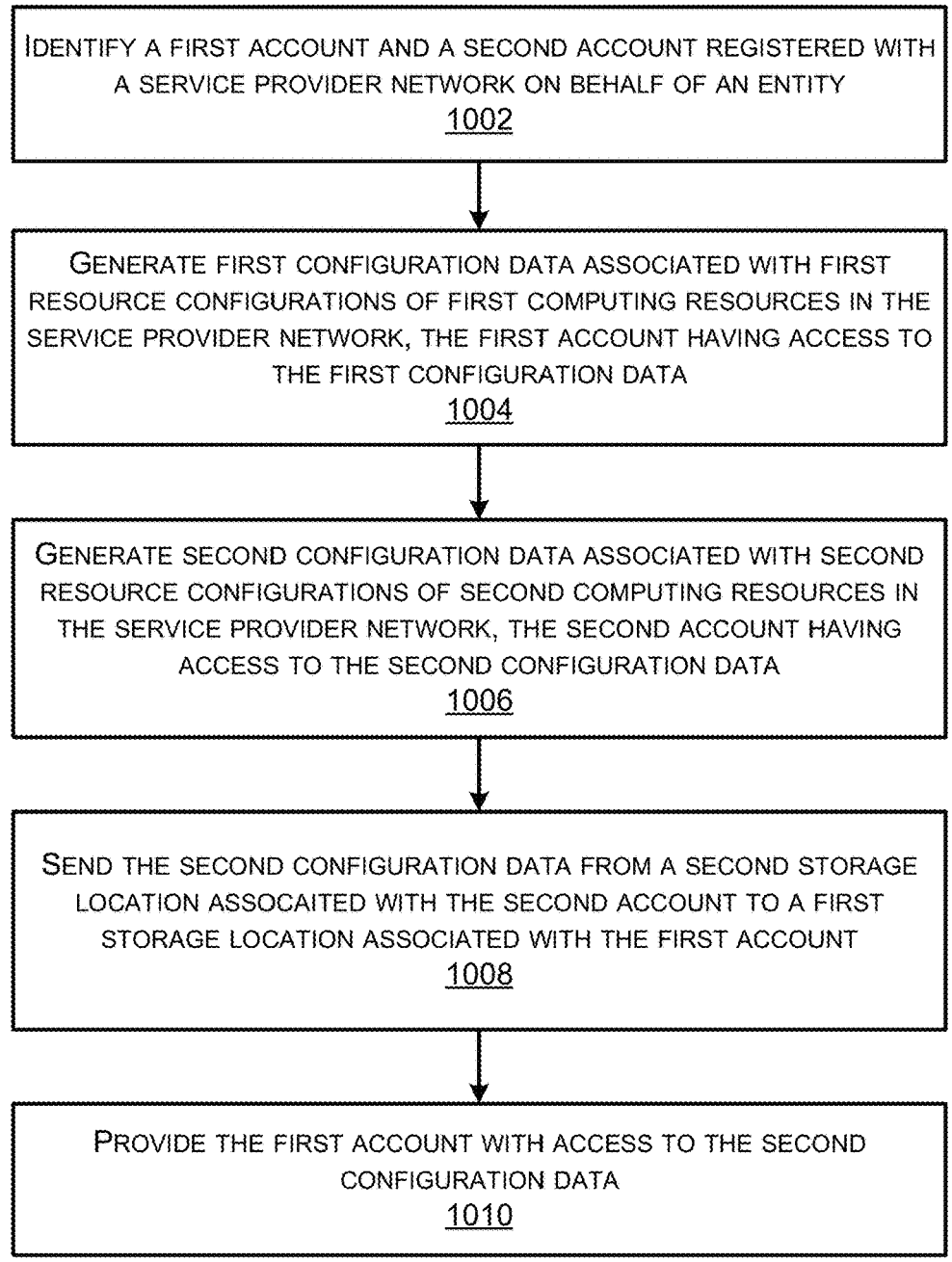
FIG. 10 illustrates a flow diagram of an example method for a configuration-monitoring service to aggregate configuration data from a source account to an aggregator account, and provide access to the source configuration data to a user of the aggregator account.

FIG. 10 illustrates a flow diagram of an example method 1000 for a configuration-monitoring service 122 to aggregate configuration data 130 from a source account 206 to an aggregator account 204, and provide access to the source configuration data 130 to a user 106 of the aggregator account 204.

At 1002, the configuration-monitoring service 122 may identify a first account and a second account registered with a service provider network on behalf of an entity, the first account being associated with first computing resources of the service provider network and the second account being associated with second computing resources of the service provider network.

At 1004, the configuration-monitoring service 122 may generate first configuration data associated with first resource configurations of the first computing resources, the first account having access to the first configuration data. For example, the configuration-monitoring service 122 may generate configuration data 128 for an aggregator region 110 that indicates resource configurations for the first computing resources 118. The configuration data 128 may indicate other types of data, in some examples. The configuration-monitoring service 122 may generate the configuration data 128 by analyzing the resources 118 and their configurations, and may detect changes in configurations.

At 1006, the configuration-monitoring service 122 may generate second configuration data associated with second resource configurations of the second computing resources, the second account having access to the second configuration data. For example, the configuration-monitoring service 122 may generate configuration data 130 for a source region 112 that indicates resource configurations for the second computing resources 120. The configuration data 130 may indicate other types of data, in some examples. The configuration-monitoring service 122 may generate the configuration data 130 by analyzing the resources 120 and their configurations, and may detect changes in configurations.

At 1008, the configuration-monitoring service 122 may send the second configuration data from a second storage location associated with the second account to a first storage location associated with the first account. For instance, the mapping data 212 may be placed into the storage resource 138 in the aggregator region 110, and replicated into storage resources 136 for the source regions 112. In some examples, the mapping data 212 may be sent or transported from the aggregator region 110 to the source regions 112 using any communication means.

At 1010, the configuration-monitoring service 122 may provide the first account with access to the second configuration data. For instance, the aggregator account 204 may be provided access, via the web interface 140, to the second configuration data 130, in some instances, along with the config data 128.

In some instances, the method of 1000 may be performed for two accounts that manage resources in a same region (e.g., different types of resources, different groupings of resources, etc.). However, in some examples, the first computing resources and the first storage location are located in a first geographic region of the service provider network, and the second computing resources and the second storage location are located in a second geographic region of the service provider network.

In some examples, the second configuration data may indicate second resource configurations of different types of computing resources of the second computing resources. For example, the second configuration data may indicate second resource configurations for memory resources, compute resources, storage resources, security resources, network resources, and so forth.

In some instances, the first configuration data and/or second configuration data may comprise any type of configuration data associated with the first resource configurations and/or second resource configurations, such as compliance data, baseline configurations, and so forth.

Figure 11:
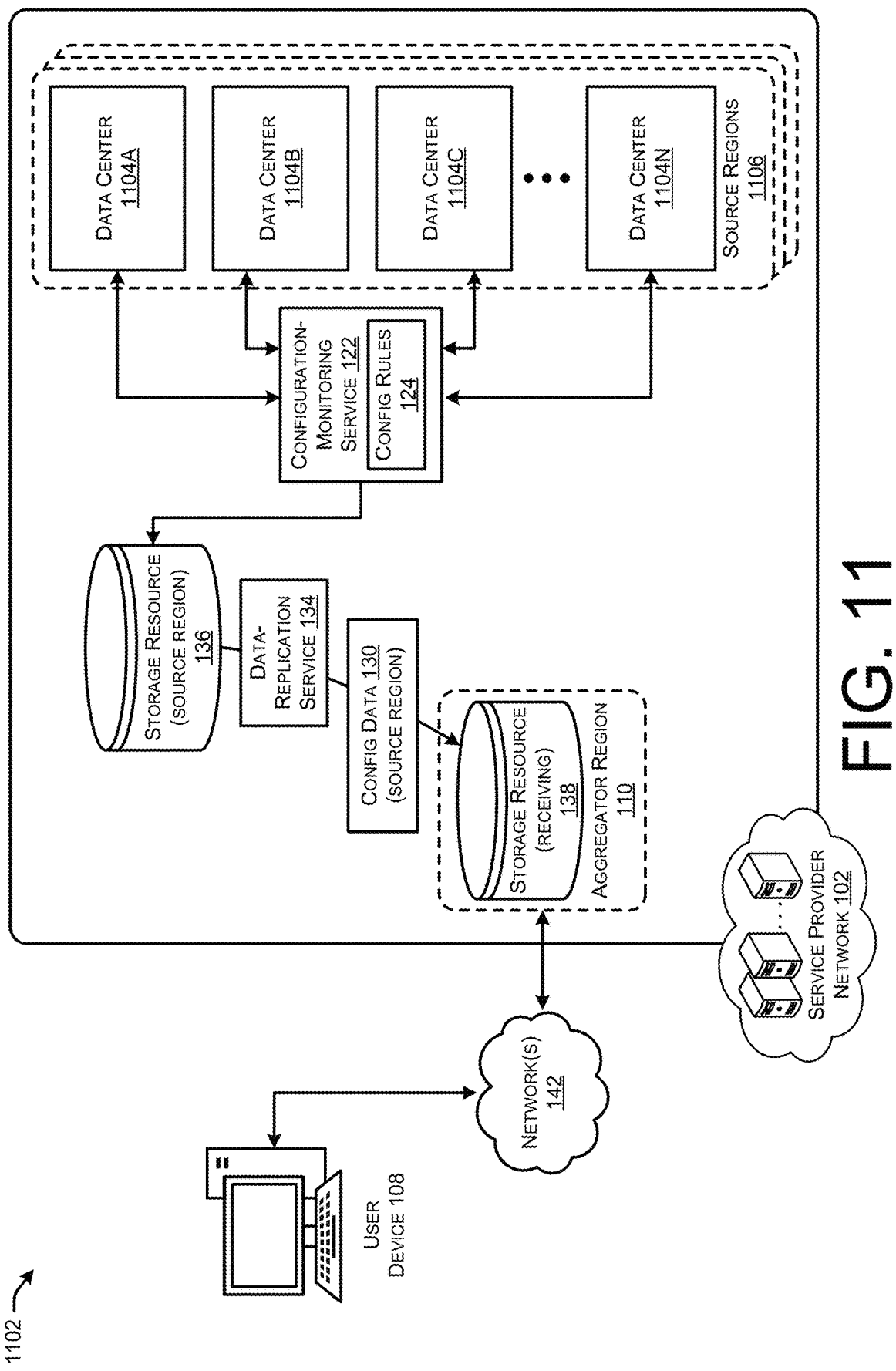
FIG. 11 is a system and network diagram that shows an illustrative operating environment that includes a service provider network that can be configured to implement aspects of the functionality described herein.

FIG. 11 is a system and network diagram that shows an illustrative operating environment that includes a service provider network 102 that can be configured to implement aspects of the functionality described herein. The service provider network 102 can provide computing resources, like VM instances and storage, on a permanent or an as-needed basis. Among other types of functionality, the computing resources 120 provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 1104A-1104N (which might be referred to herein singularly as "a data center 1104" or in the plural as "the data centers 1104"). The data centers 1104 are facilities utilized to house and operate computer systems and associated components. The data centers 1104 typically include redundant and backup power, communications, cooling, and security systems. The data centers 1104 can also be located in geographically disparate locations, or regions 1106. One illustrative embodiment for a data center 1104 that can be utilized to implement the technologies disclosed herein will be described below with regard to FIG. 12.

The users 106 of the user devices 108 that utilize the service provider network 102 may access the computing resources provided by the service provider network 102 over any wired and/or wireless network(s) 142, which can be a wide area communication network ("WAN"), such as the Internet, an intranet or an Internet service provider ("ISP") network or a combination of such networks. For example, and without limitation, a user device 108 operated by a user 106 of the service provider network 102 may be utilized to access the service provider network 102 by way of the network(s) 142. It should be appreciated that a local-area network ("LAN"), the Internet, or any other networking topology known in the art that connects the data centers 1104 to remote clients and other users can be utilized. It should also be appreciated that combinations of such networks can also be utilized.

Figure 12:
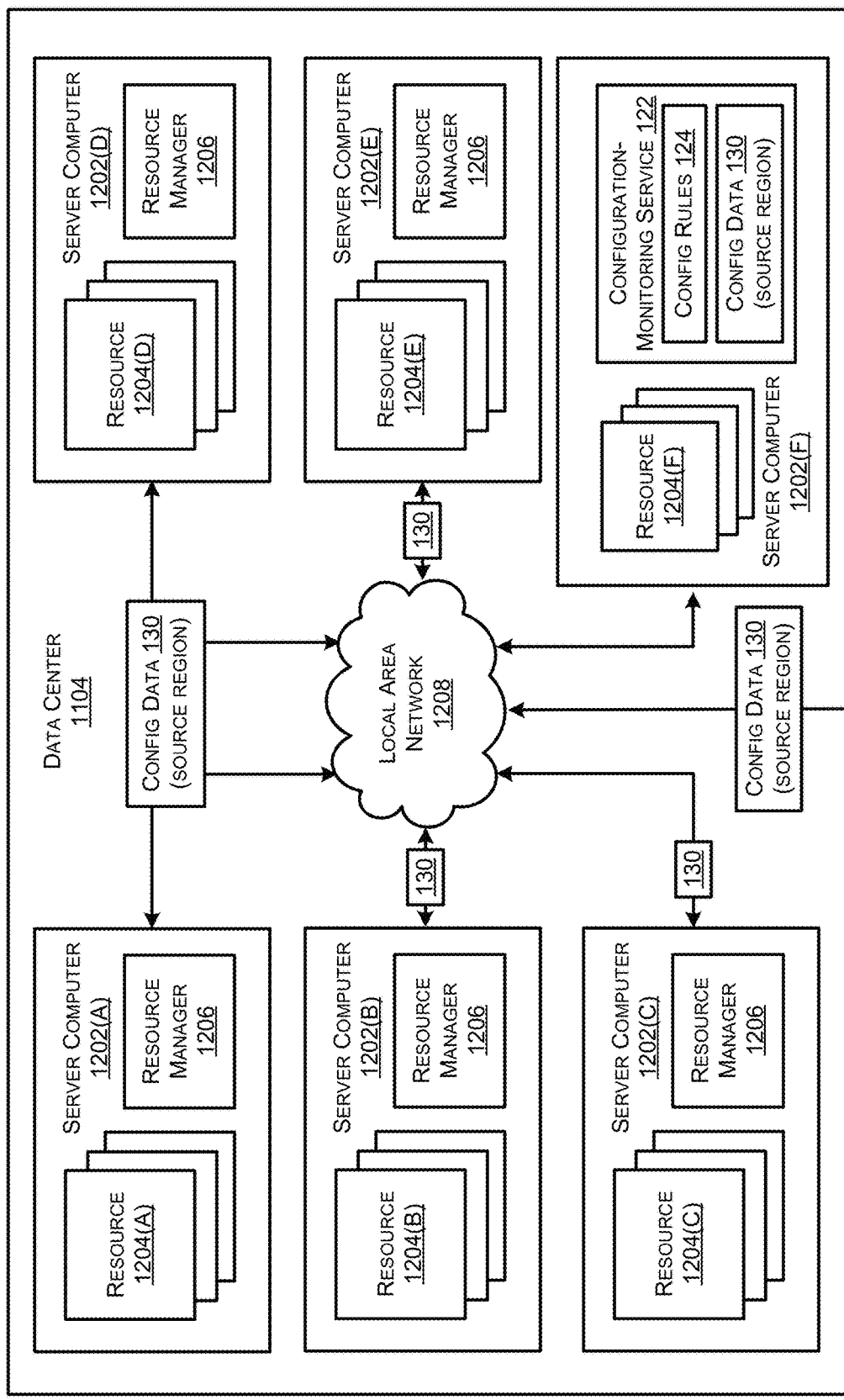
FIG. 12 is a computing system diagram illustrating a configuration for a data center that can be utilized to implement aspects of the technologies disclosed herein.

FIG. 12 is a computing system diagram 900 that illustrates one configuration for a data center 1104 that implements aspects of the technologies disclosed herein. The example data center 1104 shown in FIG. 12 includes several server computers 1202A-1202F (which might be referred to herein singularly as "a server computer 1202" or in the plural as "the server computers 1202") for providing computing resources 1204A-1204E. In some examples, the resources 1204 and/or server computers 1202 may include, be included in, or correspond to, the computing resource network 122 described herein.

The server computers 1202 can be standard tower, rack-mount, or blade server computers configured appropriately for providing the computing resources described herein (illustrated in FIG. 12 as the computing resources 1204A-1204E). As mentioned above, the computing resources provided by the service provider network 102 can be data processing resources such as VM instances or hardware computing systems, database clusters, computing clusters, storage clusters, data storage resources, database resources, networking resources, and others. Some of the servers 1202 can also be configured to execute a resource manager 1206 capable of instantiating and/or managing the computing resources. In the case of VM instances, for example, the resource manager 1206 can be a hypervisor or another type of program configured to enable the execution of multiple VM instances on a single server computer 1202. Server computers 1202 in the data center 1104 can also be configured to provide network services and other types of services.

In the example data center 1104 shown in FIG. 12, an appropriate LAN 1208 is also utilized to interconnect the server computers 1202A-1202F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1104A-1104N, between each of the server computers 1202A-1202F in each data center 1104, and, potentially, between computing resources in each of the server computers 1202. It should be appreciated that the configuration of the data center 1104 described with reference to FIG. 12 is merely illustrative and that other implementations can be utilized.

The data center 1104 shown in FIG. 12 also includes a server computer 1202F that can execute some or all of the software components described above. For example, and without limitation, the server computer 1202F (and the other server computers 1202) can generally be included in to the computing resources 114 of FIG. 1 and be configured to execute components, including the resource manager 1206, and/or the other software components described above. The server computer 1202F can also be configured to execute other components and/or to store data for providing some or all of the functionality described herein. In this regard, it should be appreciated that the services illustrated in FIG. 12 as executing on the server computer 1202F can execute on many other physical or virtual servers in the data centers 1204 in various embodiments.

Figure 13:
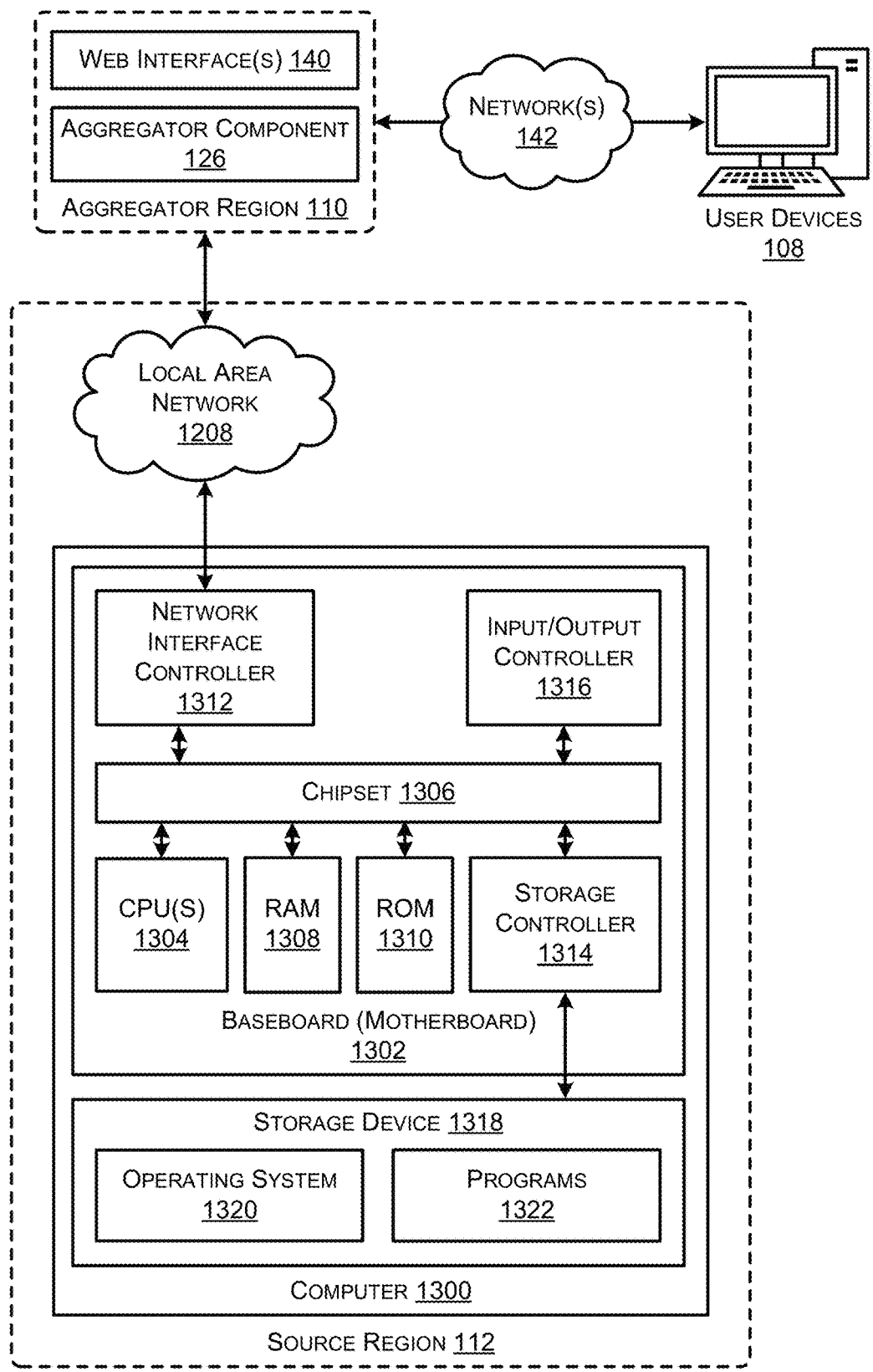
FIG. 13 is a computer architecture diagram showing an illustrative computer hardware architecture for implementing a computing device that can be utilized to implement aspects of the various technologies presented herein.

FIG. 13 shows an example computer architecture for a computer 1300 capable of executing program components for implementing the functionality described above. The computer architecture shown in FIG. 13 illustrates a conventional server computer, workstation, desktop computer, laptop, tablet, network appliance, e-reader, smartphone, or other computing device, and can be utilized to execute any of the software components presented herein. In some examples, the server computer 1300 may correspond to, or be the same as or similar to, a computing resource 118/120 described in FIG. 1.

The computer 1300 includes a baseboard 1302, or "motherboard," which is a printed circuit board to which a multitude of components or devices can be connected by way of a system bus or other electrical communication paths. In one illustrative configuration, one or more central processing units ("CPUs") 1304 operate in conjunction with a chipset 1306. The CPUs 1304 can be standard programmable processors that perform arithmetic and logical operations necessary for the operation of the computer 1300.

The CPUs 1304 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1306 provides an interface between the CPUs 1304 and the remainder of the components and devices on the baseboard 1302. The chipset 1306 can provide an interface to a RAM 1308, used as the main memory in the computer 1300. The chipset 1306 can further provide an interface to a computer-readable storage medium such as a read-only memory ("ROM") 1310 or non-volatile RAM ("NVRAM") for storing basic routines that help to startup the computer 1300 and to transfer information between the various components and devices. The ROM 1310 or NVRAM can also store other software components necessary for the operation of the computer 1300 in accordance with the configurations described herein.

The computer 1300 can operate in a networked environment using logical connections to remote computing devices and computer systems through a network, such as the network 1208. The chipset 1306 can include functionality for providing network connectivity through a NIC 1312, such as a gigabit Ethernet adapter. The NIC 1312 is capable of connecting the computer 1300 to other computing devices over the network 1208 (or 120). It should be appreciated that multiple NICs 1312 can be present in the computer 1300, connecting the computer to other types of networks and remote computer systems.

The computer 1300 can be connected to a mass storage device 1318 that provides non-volatile storage for the computer. The mass storage device 1318 can store an operating system 1320, programs 1322, and data, which have been described in greater detail herein. The mass storage device 1318 can be connected to the computer 1300 through a storage controller 1314 connected to the chipset 1306. The mass storage device 1318 can consist of one or more physical storage units. The storage controller 1314 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1300 can store data on the mass storage device 1318 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1318 is characterized as primary or secondary storage, and the like.

For example, the computer 1300 can store information to the mass storage device 1318 by issuing instructions through the storage controller 1314 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1300 can further read information from the mass storage device 1318 by detecting the physical states or characteristics of one or more particular locations within the physical storage units.

In addition to the mass storage device 1318 described above, the computer 1300 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1300. In some examples, the operations performed by the service provider network 102, and any components included therein, may be supported by one or more devices similar to computer 1300. Stated otherwise, some or all of the operations performed by the service provider network 102, and or any components included therein, may be performed by one or more computer devices 1300 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1318 can store an operating system 1320 utilized to control the operation of the computer 1300. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1318 can store other system or application programs and data utilized by the computer 1300.

In one embodiment, the mass storage device 1318 or other computer-readable storage media is encoded with computer-executable instructions which, when loaded into the computer 1300, transform the computer from a general-purpose computing system into a special-purpose computer capable of implementing the embodiments described herein. These computer-executable instructions transform the computer 1300 by specifying how the CPUs 1304 transition between states, as described above. According to one embodiment, the computer 1300 has access to computer-readable storage media storing computer-executable instructions which, when executed by the computer 1300, perform the various processes described above with regard to FIGS. 1-9. The computer 1300 can also include computer-readable storage media having instructions stored thereupon for performing any of the other computer-implemented operations described herein.

The computer 1300 can also include one or more input/output controllers 1316 for receiving and processing input from a number of input devices, such as a keyboard, a mouse, a touchpad, a touch screen, an electronic stylus, or other type of input device. Similarly, an input/output controller 1316 can provide output to a display, such as a computer monitor, a flat-panel display, a digital projector, a printer, or other type of output device. It will be appreciated that the computer 1300 might not include all of the components shown in FIG. 10, can include other components that are not explicitly shown in FIG. 13, or might utilize an architecture completely different than that shown in FIG. 13.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   a computing resource network of a service provider network that is managed by a service provider, the computing resource network comprising:
      first computing resources in a first region that are available for use by a first account of a group of accounts; and
      second computing resources in a second region that are available for use by a second account of the group of accounts, the group of accounts being registered with the service provider network by a single entity; and
   a configuration-monitoring service of the service provider network, the configuration-monitoring service comprising:
      one or more processors; and
      one or more computer-readable media storing computer-executable instructions that, when executed by the one or more processors, cause the one or more processors to:
         provide the first account with a listing of additional accounts from the group of accounts;
         receive input data indicating a selection of at least the second account from the listing of the additional accounts;
         generate first configuration data indicating first resource configurations of the first computing resources;
         generate second configuration data indicating second resource configurations of the second computing resources;
         receive, via the first account, a request to access the first configuration data and the second configuration data using the first account;
         generate aggregation-mapping data that indicates that the second configuration data is to be routed from the second account to the first account;
         replicate the aggregation-mapping data from a first storage resource located in the first region to a second storage resource located in the second region;
         based on the aggregation-mapping data, store the second configuration data in the second storage resource;
         replicate the second configuration data from the second storage resource to the first storage resource;
         obtain the second configuration data from the first storage resource in the first region; and
         provide the first account with access to the second configuration data.

2. The system of claim 1, wherein the second configuration data includes at least one of:
   a first indication of the second computing resources in the second region;
   a second indication of configuration rules defining permissible configurations of the second computing resources;

a third indication of a number of the second computing resources that are in compliance with configuration rules that define permissible configurations for the second computing resources; or a fourth indication of a number of configuration rules that are being complied with by the second computing resources.

3. The system of claim 1, comprising further computer-executable instructions that, when executed by the one or more processors, cause the one or more processors to:

detect a change in the second resource configurations of the second computing resources;

generate third configuration data indicating third resource configurations of the second computing resources in the second region, wherein the third resource configurations differ from the second resource configurations based at least in part on the change;

replicate the third configuration data from the second storage resource to the first storage resource; and provide the first account with access to the third configuration data.

4. The system of claim 1, wherein:

the computing resource network further comprises third computing resources in a third region that are available for use by a third account of the group of accounts; and the aggregation-mapping data further indicates that third configuration data indicating third resource configurations of the third computing resources is to be routed from the third account associated with the third region to the first account in the first region.

5. A computer-implemented method comprising:

identifying a first account registered with a service provider network on behalf of an entity, the first account being associated with first computing resources in a first region of the service provider network;

providing the first account with a listing of additional accounts from a group of accounts associated with the entity, the group of accounts including the first account;

receiving input data indicating a selection of at least a second account from the listing of the additional accounts, the second account being associated with second computing resources in a second region of the service provider network;

storing, in a first storage location in the first region, first configuration data associated with first resource configurations of the first computing resources, the first account having access to the first configuration data;

receiving, from a second storage location in the second region, second configuration data associated with second resource configurations of the second computing resources, the second account having access to the second configuration data;

storing the second configuration data from the second storage location in the second region in at least one of the first storage location or a third storage location in the first region; and providing the first account with access to the second configuration data.

6. The computer-implemented method of claim 5, further comprising:

receiving a request that the first account be provided with access to the second configuration data associated with the second resource configurations of the second computing resources; and identifying a set of permissions associated with the first account, wherein the set of permissions grant the first account with access to the second configuration data.

7. The computer-implemented method of claim 5, further comprising:

receiving a request that the first account be provided with access to additional configuration data associated with the additional accounts registered with the service provider; and determining that the first account is included in the group of accounts associated with the entity and defined using an account-management service associated with the service provider network.

8. The computer-implemented method of claim 5, further comprising:

determining that a period of time has passed from sending the second configuration data to the first storage location in the first region;

generating third configuration data indicating third resource configurations of the second computing resources; and based at least in part on the period of time passing, sending the third configuration data to the first storage location in the first region.

9. The computer-implemented method of claim 5, further comprising:

detecting a change in the second resource configurations of the second computing resources;

generating third configuration data indicating third resource configurations of the second computing resources in the second region, wherein the third resource configurations differ from the second resource configurations based at least in part on the change; and sending the third configuration data from the second storage location to the first storage location.

10. The computer-implemented method of claim 5, wherein the second configuration data includes at least one of:

a first indication of the second computing resources in the second region that are available for use by the second account;

a second indication of configuration rules defining permissible configurations of the second computing resources;

a third indication of a number of the second computing resources that are in compliance with configuration rules that define permissible configurations for the second computing resources; or a fourth indication of a number of configuration rules that are being complied with by the second computing resources.

11. The computer-implemented method of claim 5, further comprising:

receiving an indication that the first account is to be provided with the second configuration data from the second region;

generating mapping data indicating that the second configuration data is to be routed from the second account associated with the second region to the first account; and sending the mapping data to a device in the second region.

12. The computer-implemented method of claim 5, further comprising, prior to sending the second configuration data, determining at least one of:

an amount of data stored in the second storage location is greater than or equal to a threshold amount of data; or a threshold period of time has passed from a previous time at which configuration data was previously sent from the second storage location to the first storage location, wherein sending the second configuration data from the second storage location to the first storage location comprises replicating the second configuration data from the second storage location to the first storage location.

13. The computer-implemented method of claim 5, further comprising:
providing the first account with access to a web-based dashboard that includes one or more user interfaces; and
causing the web-based dashboard to present indications of at least a portion of the first configuration data and the second configuration data via the one or more user interfaces.

14. A system comprising:
one or more processors; and
one or more computer-readable media storing computer-executable instructions that, when executed by the one or more processors, cause the one or more processors to:
identify a first account registered with a service provider network on behalf of an entity, the first account being associated with first computing resources of the service provider network;
provide the first account with a listing of additional accounts from a group of accounts associated with the entity, the group of accounts including the first account;
receive input data indicating a selection of at least a second account from the listing of the additional accounts, the second account being associated with second computing resources of the service provider network;
generate first configuration data associated with first resource configurations of the first computing resources, the first account having access to the first configuration data;
receive, from a second storage location associated with the second account, second configuration data associated with second resource configurations of the second computing resources, the second account having access to the second configuration data;
store the second configuration data from the second storage location associated with the second account in a first storage location associated with the first account; and
provide the first account with access to the second configuration data.

15. The system of claim 14, wherein:
the first computing resources and the first storage location are located in a first region of the service provider network; and
the second computing resources and the second storage location are located in a second region of the service provider network.

16. The system of claim 15, comprising further computer-executable instructions that, when executed by the one or more processors, cause the one or more processors to:
receive an indication that the first account is to be provided with the second configuration data from the second region;
generate mapping data indicating that the second configuration data is to be routed from the second account associated with the second region to the first account; and
send the mapping data to a device in the second region.

17. The system of claim 14, comprising further computer-executable instructions that, when executed by the one or more processors, cause the one or more processors to:
detect a change in the second resource configurations of the second computing resources;
generate third configuration data indicating third resource configurations of the second computing resources, wherein the third resource configurations differ from the second resource configurations based at least in part on the change; and
send the third configuration data from the second storage location to the first storage location.

18. The system of claim 14, wherein the second configuration data includes at least one of:
a first indication of the second computing resources associated with the second account;
a second indication of configuration rules defining permissible configurations of the second computing resources;
a third indication of a number of the second computing resources that are in compliance with configuration rules that define permissible configurations for the second computing resources; or
a fourth indication of a number of configuration rules that are being complied with by the second computing resources.

19. The system of claim 14, comprising further computer-executable instructions that, when executed by the one or more processors, cause the one or more processors to:
receive a request that the first account be provided with access to the second configuration data associated with the second resource configurations of the second computing resources; and
identify a set of permissions associated with the first account, wherein the set of permissions grant the first account with access to the second configuration data.

20. The system of claim 14, comprising further computer-executable instructions that, when executed by the one or more processors, cause the one or more processors to:
provide the first account with access to a web-based dashboard that includes one or more user interfaces; and
cause the web-based dashboard to present indications of at least a portion of the first configuration data and the second configuration data via the one or more user interfaces.

* * * * *